United States Patent
Peng et al.

(10) Patent No.: US 12,294,948 B2
(45) Date of Patent: May 6, 2025

(54) METHOD FOR REDUCING UNNECESSARY PAGING

(71) Applicant: ZTE Corporation, Guangdong (CN)

(72) Inventors: Focai Peng, Guangdong (CN); Jun Xu, Guangdong (CN); Mengzhu Chen, Guangdong (CN); Xuan Ma, Guangdong (CN); Yuzhou Hu, Guangdong (CN); Jing Liu, Guangdong (CN); Qiujin Guo, Guangdong (CN); Xiaoying Ma, Guangdong (CN); Cuihong Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 272 days.

(21) Appl. No.: 17/886,400

(22) Filed: Aug. 11, 2022

(65) Prior Publication Data

US 2023/0081856 A1  Mar. 16, 2023

Related U.S. Application Data

(63) Continuation of application No. PCT/CN2020/075398, filed on Feb. 14, 2020.

(51) Int. Cl.
  *H04W 52/02* (2009.01)
  *H04W 68/00* (2009.01)
  *H04W 72/0446* (2023.01)

(52) U.S. Cl.
  CPC ... *H04W 52/0235* (2013.01); *H04W 52/0212* (2013.01); *H04W 68/005* (2013.01); *H04W 72/0446* (2013.01)

(58) Field of Classification Search
  None
  See application file for complete search history.

(56) References Cited

U.S. PATENT DOCUMENTS

| 11,044,739 | B2  | 6/2021  | Li et al. |
| 11,818,685 | B2  | 11/2023 | Hwang et al. |
| 2018/0035447 | A1* | 2/2018 | Kim ................. H04W 72/1263 |
| 2018/0324746 | A1  | 11/2018 | Balasubramanian et al. |
| 2019/0191409 | A1  | 6/2019  | Stojanovski et al. |
| 2019/0239189 | A1  | 8/2019  | Hwang et al. |
| 2020/0053670 | A1  | 2/2020  | Jung et al. |
| 2020/0092814 | A1  | 3/2020  | Zhou et al. |
| 2020/0267646 | A1* | 8/2020  | Nam ................. H04W 52/0235 |

(Continued)

FOREIGN PATENT DOCUMENTS

| CN | 109246814 A | 1/2019 |
| CN | 110291750 A | 9/2019 |

(Continued)

OTHER PUBLICATIONS

International Search Report and Written Opinion for PCT/CN2020/098905, dated Mar. 29, 2021, 9 pages.

(Continued)

*Primary Examiner* — Jutai Kao
(74) *Attorney, Agent, or Firm* — Perkins Coie LLP

(57) ABSTRACT

A wireless communication method for use in a wireless terminal comprises receiving, from a wireless network node, a signal associated with a paging message, and processing the received signal based on an event associated with an extended user equipment identification, UE ID, of the wireless terminal.

22 Claims, 14 Drawing Sheets

| Other bits | Extended UE ID (N bits) for first UE | Extended UE ID (N bits) for second UE | ... | Extended UE ID (N bits) for $K^{th}$ UE | Padding |

(56) References Cited

U.S. PATENT DOCUMENTS

| | | | |
|---|---|---|---|
| 2020/0404617 A1* | 12/2020 | Murray | H04W 16/28 |
| 2020/0413340 A1* | 12/2020 | Nam | H04W 76/20 |
| 2021/0014827 A1* | 1/2021 | Rune | H04W 68/025 |
| 2021/0314925 A1 | 10/2021 | Shin et al. | |
| 2021/0352581 A1* | 11/2021 | Wong | H04J 13/0029 |
| 2022/0182938 A1 | 6/2022 | Ye et al. | |
| 2022/0279447 A1 | 9/2022 | Zhou et al. | |
| 2023/0171141 A1* | 6/2023 | Xiong | H04L 5/0026 370/329 |

FOREIGN PATENT DOCUMENTS

| | | |
|---|---|---|
| CN | 110839214 | 2/2020 |
| JP | 2020-501431 A | 1/2020 |
| WO | 2019095331 | 5/2019 |
| WO | 2019138503 | 7/2019 |
| WO | 2019158446 A1 | 8/2019 |
| WO | 2019160463 A1 | 8/2019 |
| WO | 2020030983 A1 | 2/2020 |
| WO | 2020032740 | 2/2020 |

OTHER PUBLICATIONS

ZTE et al., "Configuration details for grouping WUS," 3GPP TSG-RAN2 meeting #108, R2-1915639, Reno, Nevada, USA, Nov. 18-22, 2019, 7 pages.

Qualcomm Inc., "Remaining issues of 6.2.1.1 UE group MWUS," 3GPP TSG-RAN WG1 #96, R1-1903286, Athens, Greece, Feb. 25-Mar. 1, 2019, 6 pages.

Mediatek Inc., "NR RRM UE power saving," 3GPP TSG RAN WG1 Meeting RAN1 #96, R1-1903354, Athens, Greece, Feb. 25-Mar. 1, 2019, 11 pages.

European Search Report for EP Patent Application No. 20943680.7, dated Oct. 21, 2022, 11 pages.

Mediatek Inc., "Evaluation methodology and paging enhancements for idle/inactive mode UE power saving," 3GPP TSG RAN WG1 #102-e, R1-2005615, e-Meeting, Aug. 17-28, 2020, 11 pages.

Qualcomm Incorporated, "Paging enhancements and evaluation methodology," 3GPP TSG-RAN WG1 #102-e, R1-2006815, e-Meeting, Aug. 17-28, 2020, 5 pages.

Moderator (Mediatek), "Summary #3 of Paging Enhancements," 3GPP TSG RAN WG1 #107-e, R1-2112886, e-Meeting, Nov. 11-19, 2021, 78 pages.

Samsung, "Corrections on UE power savings enhancements in NR," 3GPP TSG RAN WG1 #108-e, R1-2202953, e-Meeting, Feb. 21-Mar. 3, 2022, 10 pages.

ETSI TS 138 213 V17.1.0 (May 2022), Technical Specification, 5G, NR, Physical layer procedures for control, 3GPP TS 38.213 version 17.1.0, Release 17, 247 pages.

ETSI TS 138 212 V17.1.0 (Apr. 2022), Technical Specification, 5G, NR, Multiplexing and channel coding, 3GPP TS 38.212 version 17.1.0, Release 17, 201 pages.

3GPP TS 38.304 V17.0.0 (Mar. 2022), Technical Specification, 3rd Generation Partnership Project; Technical Specification Group Radio Access Network; NR: User Equipment (UE) procedures in Idle mode and RRC; Inactive state, Release 17, 50 pages.

3GPP TS 38.321 V17.1.0 (Jun. 2022), Technical Specification, 3rd Generation Partnership Project; Technical Specification Group Radio Access Network; NR: Medium Access Control (MAC) protocol specification; Release 17, 241 pages.

Mediatek et al., "Introduction of PEI-RNTI," 3GPP TSG-RAN WG2 Meeting #118, R2-2205212, eMeeting, May 9-20, 2022, 4 pages.

ETSI TS 138 212 V17.3.0 (Sep. 2022), Technical Specification, 5G, NR, Multiplexing and channel coding, 3GPP TS 38.212 version 17.3.0, Release 17, 206 pages.

ETSI TS 138 213 V17.3.0 (Sep. 2022), Technical Specification, 5G, NR, Physical layer procedures for control, 3GPP TS 38.213 version 17.3.0, Release 17, 262 pages.

3GPP TS 38.331 V17.2.0 (Sep. 2022), Technical Specification, 3rd Generation Partnership Project; Technical Specification Group Radio Access Network; NR: Radio Resource Control (RRC) protocol specification; Release 17, 1298 pages.

3GPP TS 38.304 V17.2.0 (Sep. 2022), Technical Specification, 3rd Generation Partnership Project; Technical Specification Group Radio Access Network; NR: User Equipment (UE) procedures in Idle mode and RRC; Inactive state, Release 17, 50 pages.

ETSI TS 138 211 V17.1.0 (Apr. 2022), Technical Specification, 5G, NR, Physical channels and modulation, 3GPP TS 38.211 version 17.1.0, Release 17, 140 pages.

International Search Report and Written Opinion for International Application No. PCT/CN2020/075398, mailed on Nov. 4, 2020 (8 pages).

Japanese office action issued in JP Patent Application No. 2022-579732, dated Nov. 24, 2023, 7 pages. English translation included.

Chinese office action issued in CN Patent Application No. 202080102100.8, dated Sep. 15, 2023, 13 pages. English translation included.

Huawei et al., "UE-group wake-up signal," 3GPP TSG RAN WG1 Meeting #95, R1-1812133, Spokane, USA, Nov. 12-16, 2018, 9 pages.

Chinese Notification to Complete Formalities of Registration issued in CN Patent Application No. 202080102100.9, dated May 1, 2024, 6 pages. English translation included.

Ericsson, "Design of PDCCH-WUS," 3GPP TSG-RAN WG1 Meeting #98bis, Tdoc R1-1911009, Chongqing, China, Oct. 14-20, 2019, 15 pages.

Qualcomm Incorporated, "UE-group wake-up signal for NB-IoT," 3GPP TSG-RAN WG1 #97, R1-1907000, Reno, USA, May 13-17, 2019, 10 pages.

Japanese Notice of Allowance issued in JP Patent Application No. 2022-579732, dated May 31, 2024, 3 pages. English translation included.

European Search Report issued in EP Patent Application No. 20891181.8, dated Jul. 24, 2023, 10 pages.

ZTE Corporation, "Consideration on UE ID of PO calculation for NB-IoT connection to 5GC," 3GPP TSG-RAN WG2 #108, R2-1914723, Reno, Nevada, USA, Nov. 18-22, 2019, 5 pages.

CMCC, "Consideration on resource of power saving signal for paging monitoring," 3GPP TSG RAN WG1 #96, R1-1902342, Athens, Greece, Feb. 25-Mar. 1, 2019, 4 pages.

Huawei et al., "UE power saving for paging," 3GPP TSG RAN WG1 Meeting #96, R1-1903192, Athens, Greece, Feb. 25-Mar. 1, 2019, 5 pages.

Chinese office action issued in CN Patent Application No. 202310289692.5, dated Jan. 19, 2024, 12 pages. English translation included.

Chinese office action issued in CN Patent Application No. 202080102100.9, dated Jan. 3, 2024, 7 pages. English translation included.

Chinese office action issued in CN Patent Application No. 202310289692.5, dated Sep. 25, 2023, 12 pages. English translation included.

International Preliminary Report on Patentability issued in International Patent Application No. PCT/CN2020/075398, dated Aug. 11, 2022, 6 pages.

United States Non-Final Office Action issued in U.S. Appl. No. 17/663,918, dated Sep. 23, 2024, 36 pages.

United States Final Office Action issued in co-pending U.S. Appl. No. 17/663,918, dated Nov. 15, 2024, 20 pages.

Notice of Allowance for Co-pending U.S. Appl. No. 17/663,918, dated Jan. 29, 2025, 10 pages.

* cited by examiner

| P-RNTI (in Hex) | Extended UE ID (in Binary) | Note |
|---|---|---|
| FFFE | Not Avalable (N/A) | N/A |
| FFFD | 00 | Last 12th bit and last 11th bit (i.e., 12th and 11th LSBs) of 5G S-TMSI are extended UE ID |
| FFFC | 01 | |
| FFFB | 10 | |
| FFFA | 11 | |

| P-RNTI (in Hex) | Extended UE ID (in Binary) | Note |
|---|---|---|
| FFFE | 00 | Last 12th bit and last 11th bit (i.e., 12th and 11th LSBs) of 5G S-TMSI are extended UE ID |
| FFFD | 01 | |
| FFFC | 10 | |
| FFFB | 11 | |

FIG. 18

| P-RNTI (in Hex) | Two MSB of UE ID (in Binary) | Note |
|---|---|---|
| FFFE | 00 | Last 10th bit and last 9th bit (i.e., 10th and 9th LSBs) of 5G_S_TMSI are two MSB of UE ID (in Binary). |
| FFFD | 01 | |
| FFFC | 10 | |
| FFFB | 11 | |

FIG. 19

| P-RNTI (in Hex) | Extended UE ID (in Binary) | Note |
|---|---|---|
| FFFE | 000 | Last 13th bit to last 11th bit (i.e., 13th to 11th LSB) of 5G S-TMSI are extended UE ID (in Binary). |
| FFFD | 001 | |
| FFFC | 010 | |
| FFFB | 011 | |
| FFFA | 100 | |
| FFF9 | 101 | |
| FFF8 | 110 | |
| FFF7 | 111 | |

FIG. 20

| the last 11th bit of 5G S-TMSI | First Scheme | Second Scheme |
|---|---|---|
| 0 | Paging message is issued on the first PO and second PO. | Paging message is issued on the first PO and third PO. |
| 1 | Paging message is issued on the third PO and fourth PO. | Paging message is issued on the second PO and fourth PO. |

FIG. 21

| the last 12th bit and 11th bit of 5G S-TMSI | PO |
|---|---|
| 00 | Paging message is issued on the first PO. |
| 01 | Paging message is issued on the second PO. |
| 10 | Paging message is issued on the third PO. |
| 11 | Paging message is issued on the fourth PO. |

FIG. 22

| 2 MSBs of UE ID | PO |
|---|---|
| 00 | Paging message is issued on the first PO. |
| 01 | Paging message is issued on the second PO. |
| 10 | Paging message is issued on the third PO. |
| 11 | Paging message is issued on the fourth PO. |

FIG. 23

| MSB of UE ID | Third Scheme | Fourth Scheme |
|---|---|---|
| 0 | Paging message is issued on the first PO and second PO. | Paging message is issued on the first PO and third PO. |
| 1 | Paging message is issued on the third PO and fourth PO. | Paging message is issued on the second PO and fourth PO. |

FIG. 24

| The last 11<sup>th</sup> bit of 5G S-TMSI | First Scheme | Second Scheme |
|---|---|---|
| 0 | The first pagingSearchSpace is used to schedule paging message. | The pagingSearchSpace with least ID is used to schedule paging message. |
| 1 | The second pagingSearchSpace is used to schedule paging message. | The pagingSearchSpace with most ID is used to schedule paging message. |

FIG. 25

| The last 12th bit and the last 11th bit of 5G S-TMSI | pagingSearchSpace |
|---|---|
| 00 | The first pagingSearchSpace is used to schedule paging message. |
| 01 | The second pagingSearchSpace is used to schedule paging message. |
| 10 | The third pagingSearchSpace is used to schedule paging message. |
| 11 | The fourth pagingSearchSpace is used to schedule paging message. |

FIG. 26

| MSB of UE ID | First Scheme | Second Scheme |
|---|---|---|
| 0 | The first pagingSearchSpace is used to schedule paging message. | The pagingSearchSpace with least ID is used to schedule paging message. |
| 1 | The second pagingSearchSpace is used to schedule paging message. | The pagingSearchSpace with most ID is used to schedule paging message. |

FIG. 27

| RRC state of UE | First Scheme | Second Scheme |
|---|---|---|
| RRC_Idle | first pagingSearchSpace is used to schedule paging message | pagingSearchSpace with least ID is used to schedule paging message |
| RRC_Inactive | second pagingSearchSpace is used to schedule paging message | pagingSearchSpace with most ID is used to schedule paging message |

FIG. 28

| 2 LSBs of I-RNTI-Value of RRC_Inactive UE | pagingSearchSpace |
|---|---|
| 00 | The first pagingSearchSpace is used to schedule paging message. |
| 01 | The second pagingSearchSpace is used to schedule paging message. |
| 10 | The third pagingSearchSpace is used to schedule paging message. |
| 11 | The fourth pagingSearchSpace is used to schedule paging message. |

FIG. 29

| 2 MSBs of UE ID | pagingSearchSpace |
|---|---|
| 00 | The first pagingSearchSpace is used to schedule paging message. |
| 01 | The second pagingSearchSpace is used to schedule paging message. |
| 10 | The third pagingSearchSpace is used to schedule paging message. |
| 11 | The fourth pagingSearchSpace is used to schedule paging message. |
| Legacy UE ignores the value | The fifth pagingSearchSpace is used to schedule paging message. |

FIG. 30

METHOD FOR REDUCING UNNECESSARY PAGING

CROSS-REFERENCE TO RELATED APPLICATIONS

This application is a continuation of International Patent Application No. PCT/CN2020/075398, filed on Feb. 14, 2020, the contents of which are incorporated herein by reference in their entirety.

TECHNICAL FIELD

This document is directed generally to wireless communications.

BACKGROUND

In 5$^{th}$ generation mobile communication system (5G), among others, a discontinuous reception (DRX) may be adopted for requiring a user equipment (UE) not to contiguously receive a signal/channel from a base station (BS). When the DRX is applied, the UE may intermittently receive the signal/channel for a period of time and stop receiving the signal/channel in another period of time.

SUMMARY

A period of the DRX is called as a DRX cycle and a single DRX cycle includes an ON duration DRX-ON and an OFF duration DRX-OFF. When working under a connecting state (e.g. RRC CONNECTED state), the UE applies a connected mode DRX (C-DRX). For working under an idle state (e.g. RRC IDLE state) or an inactive state (e.g. RRC INACTIVE state), the UE applies an idle mode DRX (I-DRX). In addition, for the UE working under the idle mode and/or inactive state, the UE detects possible paging message(s) during a paging occasion (PO) of each paging cycle during the ON duration DRX-ON. In some cases, however, there may be no a physical downlink (DL) control channel which schedules the paging message(s). In other cases, there may be no both the PDCCH and a physical DL shared channel (PDSCH) that carries the paging message(s). In still other cases, there may be both the PDCCH and the PDSCH but the PDSCH does not comprise a paging message for the UE. Under these circumstances, the UE may waste unnecessary power on detecting the (not existing) paging message(s).

This document relates to methods, systems, and devices for radio communications, especially, for saving a power consumption of a communication device.

The present disclosure relates to a wireless communication method for use in a wireless terminal. The wireless communication method comprises:
  receiving, from a wireless network node, a signal associated with a paging message, and
  processing the received signal based on an event associated with an extended user equipment identification, UE ID, of the wireless terminal.

Various embodiments may preferably implement the following features:

Preferably, the event is that the received signal is inconsistent to the extended UE ID of the wireless terminal, and wherein processing the received signal based on the event associated with the extended UE ID comprises: ignoring the received signal associated with the paging message.

Preferably, the event is that the received signal does not comprise the extended UE ID of the wireless terminal or that failing to decode the received signal according to the extended UE ID.

Preferably, the wireless communication method further comprises at least one of:
  discarding received control information configured to schedule the paging message if the received control information is not what the wireless terminal expects, or
  discarding the paging message in a shared channel, if the paging message is not what the wireless terminal expects.

Preferably, the wireless communication method further comprises:
  receiving control information configured to schedule the paging message, and
  discarding the control information.

Preferably, the wireless communication method further comprises:
  receiving the paging message, and
  discarding the paging message.

Preferably, the event is that the received signal is consistent to the extended UE ID of the wireless terminal.

Preferably, processing the received signal based on the event associated with the extended UE ID comprises processing the received signal.

Preferably, the wireless communication method further comprises receiving, from the wireless network node, a paging message based on a result of processing the received signal.

Preferably, the event is that the received signal comprises the extended UE ID of the wireless terminal or that the received signal is successfully decoded according to the extended UE ID of the wireless terminal.

Preferably, the extended UE ID of the wireless terminal is associated with at least one of a subset of a serving temporary mobile subscriber identity, S-TMSI, preferably a 5$^{th}$ generation, 5G, serving temporary mobile subscriber identity, S-TMSI, configured for the wireless terminal, a UE ID, a public radio network temporary identifier, P-RNTI, of the wireless terminal or a group ID of the wireless terminal.

Preferably, the signal associated with the paging message comprises at least one first extended UE ID of at least one first wireless terminal, wherein the at least one first extended UE ID is a subset of an S-TMSI, preferably a 5G S-TMSI, configured for each of the at least one first wireless terminal.

Preferably, the signal is carried by at least one of DL control information, DCI, a wake-up signal, at least one short message bit of DCI or at least one reserved bit of DCI.

Preferably, the signal is carried by the at least one short message bit of the DCI and the at least one first extended UE ID comprises bits from the last (10+N)th bit to the last 11th bit of the S-TMSI configured for each of the at least one first wireless terminal, wherein N is an integer greater than 1. Preferably, N is 4.

Preferably, the signal is carried by the at least one reserved bit of the DCI and the at least one first extended UE ID comprises bits from the last (10+M)$^{th}$ bit to the last 11$^{th}$ bit of the S-TMSI configured for each of the at least one first wireless terminal, wherein M is an integer greater than 1. Preferably, M is 6.

Preferably, the signal associated with the paging message comprises at least one of a reference signal or a wake-up signal.

Preferably, at least one of the reference signal or the wake-up signal indicates whether to receive at least one of control information scheduling the paging message or the paging message.

Preferably, the reference signal comprised in the signal associated with paging message comprises at least one of:
- a de-modulation reference signal, DMRS, on a physical downlink control channel, PDCCH,
- a DMRS on a physical downlink shared channel, PDSCH,
- a DMRS on a wake-up channel, or
- a DMRS on a PDCCH scheduling the paging message.

Preferably, the DMRS is initialized based on an initialization seed which is generated based on a second extended UE ID corresponding to at least one second wireless terminal, wherein the second extended UE ID is a subset of at least one S-TMSI, preferably a 5G S-TMSI, configured for the at least one second wireless terminal.

Preferably, the initialization seed comprises:

$$c_{init}=(Ext\_ID*2^{16}+N_{ID}) \bmod 2^{31}$$

or $$c_{init}=(2^{17}(N_{symb}^{slot}n_{s,f}^{\mu}+l+1)(2N_{ID}+1)+2N_{ID}) \bmod 2^{29}+ID_{Res}*2^{29}$$

wherein, Ext_ID is a value of the second extended UE ID, ND is a number configured by a higher layer signaling, and $ID_{Res}$ is group ID or, resources ID.

Preferably, the second extended UE ID comprises bits from the last (10+E)th bit to the last $11^{th}$ bit of the at least one S-TMSI configured for the at least one second wireless terminal, wherein, E is an integer greater than 1.

Preferably, E is 15.

Preferably, the wake-up signal comprised in the signal associated with paging message is initialized by:

$$d_{WUS}(n) = [1-2x_0((n+m_0) \bmod 127)][1-2x_1((n+m_1) \bmod 127)] \cdot e^{j\frac{\pi u n(n+1)}{131}}$$

wherein $$m_0 = 15\left\lfloor \frac{N_{ID}^{(1)}}{112} \right\rfloor + 5N_{ID}^{(2)}, m_1 = N_{ID}^{(1)} \bmod 112$$

and 0≤n<127,
wherein $\lfloor Z \rfloor$ fetches the greatest integer that does not excess the value of Z, $N_{ID}^{(1)} \in \{0, 1, \ldots, 335\}$ which is a first cell ID, $N_{ID}^{(2)} \in \{0, 1, 2\}$ which is a second cell ID,
wherein $x_0(n)$ is as the following:

$x_0(i+7)=(x_0(i+4)+x_0(i)) \bmod 2$, $x_1(i+7)=(x_1(i+4)+x_1(i)) \bmod 2$, wherein $x_0(0)=1$,
wherein $x_0(6), x_0(5), x_0(4), x_0(3), x_0(2), x_0(1)$ have the values of 6 most significant bits of a third extended UE ID,
wherein $x_1(0)=1$,
wherein $x_1(6), x_1(5), x_1(4), x_1(3), x_1(2), x_1(1)$ have the values of 6 least significant bits of the third extended UE ID, wherein the second extended UE ID comprises bits from last 22th bit to the last 11th bit of the S-TMSI configured for at least one third wireless terminal,
wherein u is 29 or has a value of the slot number of the first paging occasion within a paging frame.

Preferably, the signal associated with paging message comprises cyclic redundancy check, CRC, bits which are scrambled based by a fourth extended UE ID of at least one fourth wireless terminal.

Preferably, the fourth extended UE ID comprises bits from the last $(10+P)^{th}$ bit to the last $11^{th}$ bit of the at least one S-TMSI configured for the at least one fourth wireless terminal, wherein, P is an integer greater than 1.

Preferably, P is one of 8, 16, or 24.

The present disclosure relates to a wireless communication method for use in a wireless network node, the wireless communication method comprising:
transmitting, to a wireless terminal, a signal, and
transmitting a paging message based on the signal.

Various embodiments may preferably implement the following features:

Preferably, the signal comprises at least one first extended user equipment, UE, identification, ID, of at least one first wireless terminal, wherein the at least one first extended UE ID is a subset of a S-TMSI configured for each of the at least one first wireless terminal.

Preferably, the signal is carried by at least one of DL control information, DCI, a wake-up signal, at least one short message bit of DCI or at least one reserved bit of DCI.

Preferably, the signal is carried by the at least one short message bit of the DCI and the at least one first extended UE ID comprises bits from the last $(10+N)^{th}$ bit to the last $11^{th}$ bit of the S-TMSI configured for each of the at least one first wireless terminal, wherein N is an integer greater than 1.

Preferably, N is 4.

Preferably, the signal is carried by the at least one reserved bit of the DCI and the at least one first extended UE ID comprises bits from the last $(10+M)^{th}$ bit to the last $11^{th}$ bit of the S-TMSI configured for each of the at least one first wireless terminal, wherein M is an integer greater than 1.

Preferably, M is 6.

Preferably, the signal comprises at least one of a reference signal or a wake-up signal.

Preferably, at least one of the reference signal or the wake-up signal indicates whether to receive at least one of control information scheduling the paging message or the paging message.

Preferably, the reference signal comprised in the signal associated with paging message comprises at least one of:
- a de-modulation reference signal, DMRS, on a physical downlink control channel, PDCCH,
- a DMRS on a physical downlink shared channel, PDSCH,
- a DMRS on a wake-up channel, or
- a DMRS on a PDCCH scheduling the paging message.

Preferably, the DMRS is initialized based on an initialization seed which is generated based on a second extended UE ID corresponding to at least one second wireless terminal, wherein the second extended UE ID is a subset of at least one S-TMSI, preferably a 5G S-TMSI, configured for the at least one second wireless terminal.

Preferably, the initialization seed comprises:

$$c_{init}=(Ext\_ID*2^{16}+N_{ID}) \bmod 2^{31}$$

or $$c_{init}=(2^{17}(N_{symb}^{slot}n_{s,f}^{\mu}+l+1)(2N_{ID}+1)+2N_{ID}) \bmod 2^{29}+ID_{Res}*2^{29}$$

wherein, Ext_ID is a value of the second extended UE ID, $N_{ID}$ is a number configured by a higher layer signaling, and $ID_{Res}$ is group ID or, resources ID.

Preferably, the second extended UE ID comprises bits from the last $(10+E)^{th}$ bit to the last $11^{th}$ bit of the at least one S-TMSI configured for the at least one second wireless terminal, wherein, E is an integer greater than 1.

Preferably, E is 15.

Preferably, the wake-up signal comprised in the signal associated with paging message is initialized by:

$$d_{WUS}(n) = [1 - 2x_0((n + m_0) \bmod 127)][1 - 2x_1((n + m_1) \bmod 127)] \cdot e^{j\frac{\pi un(n+1)}{131}}$$

wherein $$m_0 = 15\left\lfloor \frac{N_{ID}^{(1)}}{112} \right\rfloor + 5N_{ID}^{(2)}, \ m_1 = N_{ID}^{(1)} \bmod 112$$

and $0 \leq n < 127$, wherein $\lfloor Z \rfloor$ fetches the greatest integer that does not excess the value of Z, $N_{ID}^{(1)} \in \{0, 1, \ldots, 335\}$ which is a first cell ID, $N_{ID}^{(2)} \in \{0, 1, 2\}$ which is a second cell ID, wherein x(n) is as the following:

$$x_0(i+7)=(x_0(i+4)+x_0(i)) \bmod 2,$$

$$x_1(i+7)=(x_1(i+4)+x_1(i)) \bmod 2,$$

wherein $x_0(0)=1$, wherein $x_0(6)$, $x_0(5)$, $x_0(4)$, $x_0(3)$, $x_0(2)$, $x_0(1)$ have the values of 6 most significant bits of a third extended UE ID, wherein $x_1(0)=1$, wherein $x_1(6)$, $x_1(5)$, $x_1(4)$, $x_1(3)$, $x_1(2)$, $x_1(1)$ have the values of 6 least significant bits of the third extended UE ID, wherein the second extended UE ID comprises bits from last 22th bit to the last 11th bit of the S-TMSI configured for at least one third wireless terminal, wherein u is 29 or has a value of the slot number of the first paging occasion within a paging frame.

Preferably, the signal comprises cyclic redundancy check, CRC, bits which are scrambled based by a fourth extended UE ID of at least one fourth wireless terminal.

Preferably, the fourth extended UE ID comprises bits from the last $(10+P)^{th}$ bit to the last $11^{th}$ bit of the at least one S-TMSI configured for the at least one fourth wireless terminal, wherein, P is an integer greater than 1.

Preferably, P is one of 8, 16, or 24.

Preferably, the extended UE ID of a wireless terminal is associated with at least one of a subset of a S-TMSI, preferably a 5G S-TMSI, configured for the wireless terminal, a UE ID, a public radio network temporary identifier, P-RNTI, of the wireless terminal or a group ID of the wireless terminal.

The present disclosure relates to a wireless communication method for use in a wireless terminal, the wireless communication method comprising:

receiving, from a wireless network node, a paging message based on a paging identification, ID, of the wireless terminal.

Various embodiments may preferably implement the following features:

Preferably, receiving, from the wireless network node, the paging message based on the paging ID of the wireless terminal comprises:

determining a power saving radio network temporary identifier for paging, PSP-RNTI, based on the paging ID of the wireless terminal, and receiving the paging message with the determined PSP-RNTI.

Preferably, receiving, from the wireless network node, the paging message based on the paging ID of the wireless terminal comprises:

determining a paging occasion, PO, based on the paging ID of the wireless terminal, and receiving the paging message at the determined PO.

Preferably, receiving, from the wireless network node, the paging message based on the paging ID of the wireless terminal comprises:

determining a paging search space based on the paging ID of the wireless terminal, and receiving the paging message scheduled by the determined paging search space.

Preferably, wherein receiving, from the wireless network node, the paging message based on the paging ID of the wireless terminal comprises:

determining a monitoring bit in a wake-up signal based on the paging ID, and receiving the paging message based on the monitoring bit.

Preferably, the paging ID of the wireless terminal is associated with at least one of a subset of a $5^{th}$ generation, 5G, serving temporary mobile subscriber identity, S-TMSI, preferably a $5^{th}$ generation, 5G, S-TMSI configured for the wireless terminal, a UE ID, a radio resource control state of the wireless terminal or a group ID of the wireless terminal.

The present disclosure relates to a wireless communication method for use in a wireless network node, the wireless communication method comprising:

transmitting, to a wireless network terminal, a paging message based on a paging identification, ID, of the wireless terminal.

Various embodiments may preferably implement the following features:

Preferably, transmitting, to the wireless terminal, the paging message based on the paging ID of the wireless terminal comprises:

determining a power saving radio network temporary identifier for paging, PSP-RNTI, based on the paging ID of the wireless terminal, and transmitting the paging message with the determined PSP-RNTI.

Preferably, transmitting, to the wireless terminal, the paging message based on the paging ID of the wireless terminal comprises:

determining a paging occasion, PO, based on the paging ID of the wireless terminal, and transmitting the paging message at the determined PO.

Preferably, transmitting, to the wireless terminal, the paging message based on the paging ID of the wireless terminal comprises:

determining a paging search space based on the paging ID of the wireless terminal, and transmitting the paging message scheduled by the determined paging search space.

Preferably, transmitting, to the wireless terminal, the paging message based on the paging ID of the wireless terminal comprises:

determining a monitoring bit in a wake-up signal based on the paging ID, and transmitting the paging message based on the monitoring bit.

Preferably, the paging ID of the wireless terminal is associated with at least one of a subset of a serving temporary mobile subscriber identity, S-TMSI, preferably a 5th generation, 5G, S-TMSI, configured for the wireless terminal, a UE ID, a radio resource control state of the wireless terminal or a group ID of the wireless terminal.

The present disclosure relates to a wireless terminal, comprising:
- a communication unit, configured to receive, from a wireless network node, a signal associated with a paging message, and
- a processor configured to process the received signal based on an event associated with an extended user equipment identification, UE ID, of the wireless terminal.

Various embodiments may preferably implement the following feature:

Preferably, the processor is further configured to perform a wireless communication method of any of the foregoing described methods.

The present disclosure relates to a wireless network node, comprising a communication unit, configured to transmit, to a wireless terminal, a signal, and transmit a paging message based on the signal.

Various embodiments may preferably implement the following feature:

Preferably, the wireless network further comprises a processor configured to perform a wireless communication method of any of the foregoing described methods.

The present disclosure relates to a wireless terminal, comprising a communication unit configured to receive, from a wireless network node, a paging message based on a paging identification, ID, of the wireless terminal.

Various embodiments may preferably implement the following feature:

Preferably, the wireless terminal further comprises a processor configured to perform a wireless communication method of any of the foregoing described methods.

The present disclosure relates to a wireless network node, comprising a communication unit, configured to transmit, to a wireless network terminal, a paging message based on a paging identification, ID, of the wireless terminal.

Various embodiments may preferably implement the following feature:

Preferably, the wireless network node comprises a processor configured to perform a wireless communication method of any of the foregoing described methods.

The present disclosure relates to a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF DRAWINGS

FIG. 18 shows an example of associating the extended UE ID with one P-RNTI according to an embodiment of the present disclosure.

FIG. 19 shows an example of associating the UE ID with one P-RNTI according to an embodiment of the present disclosure.

FIG. 20 shows an example of associating the extended UE ID with one P-RNTI according to an embodiment of the present disclosure.

FIG. 21 shows an example of dividing the PO into several groups according to an embodiment of the present disclosure.

FIG. 22 shows an example of dividing the PO into several groups according to an embodiment of the present disclosure.

FIG. 23 shows an example of dividing the PO into several groups according to an embodiment of the present disclosure.

FIG. 24 shows an example of dividing the PO into several groups according to an embodiment of the present disclosure.

FIG. 25 shows an example of the divided paging-SearchSpace according to an embodiment of the present disclosure.

FIG. 26 shows an example of the divided paging-SearchSpace according to an embodiment of the present disclosure.

FIG. 27 shows an example of the divided paging-SearchSpace according to an embodiment of the present disclosure.

FIG. 28 shows an example of the divided paging-SearchSpace according to an embodiment of the present disclosure.

FIG. 29 shows an example of the divided paging-SearchSpace according to an embodiment of the present disclosure.

FIG. 30 shows an example of the divided paging-SearchSpace according to an embodiment of the present disclosure.

DETAILED DESCRIPTION

Figure 1:
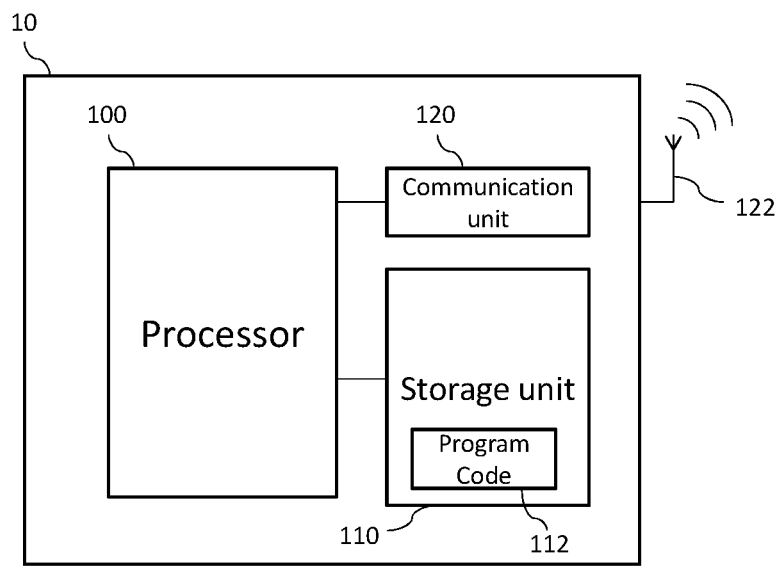
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
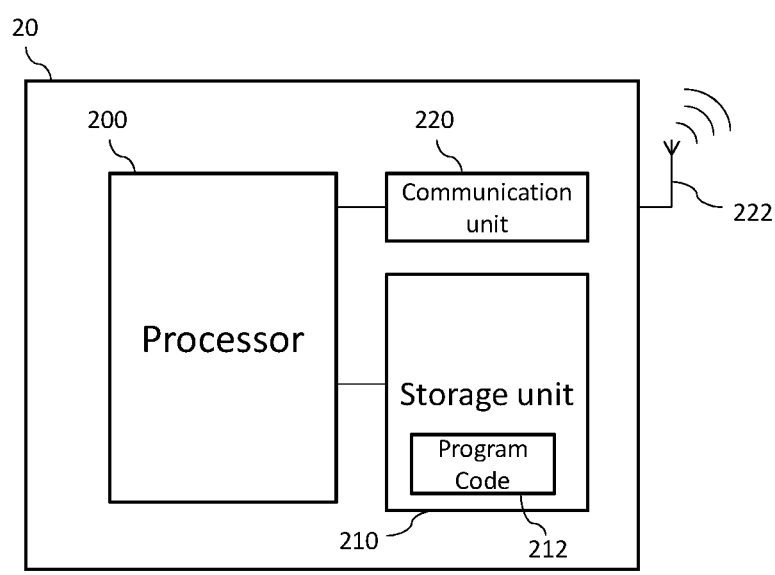
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In the present disclosure exemplary reference is made to the $5^{th}$ generation mobile communication system (5G). However it is understood by the skilled person that the present disclosure is not restricted to 5G but also covers other standards without departing from the present disclosure.

During a paging occasion (PO) of a paging cycle, a UE which is under a radio resource control (RRC) idle state (i.e. RRC_Idle) or an RRC inactive state (i.e. RRC_Inactive) may have no physical downlink control channel (PDCCH) which schedules a paging message. Furthermore, the UE may also have no physical downlink shared channel (PDSCH) which carries the paging message. Even without the corresponding PDCCH and/or the PDSCH, the UE has to receive and decode the PDCCH/PDSCH during a paging cycle, resulting in unnecessary power consumption.

In another case, during a PO, the UE may have the PDCCH but the content of corresponding PDSCH does not include an actual paging message for this UE because the network might schedule multiple paging messages together. Under such a condition, unnecessary power is wasted.

In an embodiment, the present disclosure provides a method for a UE (e.g. for data processing). The method comprises:
 a UE receives signal/channel,
 the UE compares the received signal/channel with data in the UE, and
 the UE does not process (e.g. ignore, drop or discard) the received signal/channel when the received signal/channel is inconsistent to the data in the UE (or the UE processes the received signal/channel when the received signal/channel is consistent to (e.g. identical to) the data in the UE).

In an embodiment, the signal/channel includes a reference signal (RS), a wake-up signal/channel. In this embodiment, the wake-up signal/channel may indicate that the UE needs to receive data or that the UE does not need to receive data. In this embodiment, the received data may include a signal in the PDCCH that schedules the paging message and/or a signal in the PDSCH that carries paging message.

In an embodiment, when the received signal/channel is inconsistent to the data in the UE, the received signal/channel (or a signal/channel associated with the received signal/channel) may not be what the UE expects. In this embodiment, the UE may discard (e.g. drop or ignore) the received signal/channel when the received signal/channel is not what the UE expects. In an embodiment, the signal/channel includes the PDCCH (e.g. control information) that schedules the paging message and/or the PDSCH that carries the paging message.

In an embodiment, the received channel includes a wake-up channel and/or the PDCCH that schedules paging message. In this embodiment, the PDCCH includes a signal indicate that the UE needs receive data or that UE does not need receive data. In this embodiment, the received data includes a signal received in the PDSCH that carries the paging message.

In an embodiment, the received signal/channel includes an extended UE identification (ID) that is carried on the received signal/channel. In this embodiment, the extended UE ID is a sub-set of a serving temporary mobile subscriber identity (S-TMSI). For example, the S-TMSI may be a 5G S-TMSI.

In an embodiment, the data in the UE comprises a subset of a 5G S-TMSI of the UE.

In an embodiment, the UE does not process signal/channel by at least one of:
the UE does not (expect to) receive the signal in the PDCCH that schedules the paging message,
the UE does not (expect to) receive the signal in the PDSCH that carries the paging message,
the UE does not decode the signal in the PDCCH that schedules the paging message,
the UE does not decode the signal in the PDSCH that carries the paging message, or
the UE discards already received signal in the PDSCH that carries the paging message.

In an embodiment, the received signal comprises at least one of:
a RS,
a demodulation RS (DMRS) on the PDCCH,
a DMRS on the PDSCH,
a DMRS on the wake-up channel, or
a DMRS on the PDCCH that schedules paging message.

In an embodiment, the DMRS comprises an initialization seed (e.g. an initialization sequence) which is generated for the DMRS, wherein the initialization seed includes the extended UE ID. In this embodiment, the extended UE ID includes a sub-set of the 5G S-TMSI.

In an embodiment, the initialization seed includes:

$c_{init}=(Ext\_ID*2^{16}+N_{ID})\bmod 2^{31}$, or $c_{init}=(2^{17}(N_{symb}^{slot}n_{s,f}^{\mu}+l+1)(2N_{ID}+1)+2N_{ID})\bmod 2^{29}+ID_{Res}*2^{29}$ wherein, Ext_ID is a value of the extended UE ID, $N_{ID}$ is a number configured by a higher layer signaling, $ID_{Res}$ is group ID or, resources ID. In this embodiment, the extended UE ID comprises bits from the last $(10+E)^{th}$ bit to the last $11^{th}$ bit of the 5G S-TMSI. For example, the extended UE ID may comprise bits from the last $25^{th}$ bit to the last $11^{th}$ bit of the 5G S-TMSI (i.e. E=15). In this embodiment, extended UE ID is the integer of corresponding binary bits from the last $(10+E)^{th}$ bit to the last $11^{th}$ bit of the 5G S-TMSI and $N_{ID}$ is configured by the higher layer signaling.

In an embodiment, the received channel comprises at least one short message bit, e.g., in the DCI. In this embodiment, the at least one short messages bit includes the extended UE ID. In this embodiment, the extended UE ID comprises a sub-set of 5G S-TMSI. For example, the sub-set of the 5G S-TMSI may include bits from the last $(10+N)^{th}$ bit to the last $11^{th}$ bit of the 5G S-TMSI, where N is an integer greater than 1. In an embodiment, N=4.

In an embodiment, the received channel comprises at least one reserved bit, e.g. in the DCI. In this embodiment, the at least one reserved bit includes the extended UE ID. In this embodiment, the extended UE ID may comprise a sub-set of 5G S-TMSI. For example, the subset of the 5G S-TMSI includes bits from the last $(10+M)^{th}$ bit to the last $11^{th}$ bit of the 5G S-TMSI, where M is an integer greater than 1. In an embodiment, M=6.

In an embodiment, the received channel comprises cyclic redundancy check (CRC) bits which are scrambled by the extended UE ID. In this embodiment, the extended UE ID may include bits from the last $(10+P)^{th}$ bit to the last $11^{th}$ bit of the 5G S-TMSI, where P is an integer greater than 1. In an embodiment, P=8, 16 or 24.

In an embodiment, the received signal comprises a wake-up signal which includes (e.g. is initialized by):

$$d_{WUS}(n) = [1-2x_0((n+m_0)\bmod 127)][1-2x_1((n+m_1)\bmod 127)]\cdot e^{j\frac{\pi un(n+1)}{131}}$$

wherein $$m_0 = 15\left\lfloor\frac{N_{ID}^{(1)}}{112}\right\rfloor + 5N_{ID}^{(2)}, \quad m_1 = N_{ID}^{(1)} \bmod 112$$

and 0≤n<127,
wherein $\lfloor Z \rfloor$ fetches the greatest integer that does not excess the value of Z, $N_{ID}^{(1)} \in \{0, 1, \ldots, 335\}$ which is a first cell ID, $N_{ID}^{(2)} \in \{0, 1, 2\}$ which is a second cell ID,
wherein x(n) is as the following:

$x_0(i+7)=(x_0(i+4)+x_0(i))\bmod 2$, $x_0(i+7)=(x_0(i+4)+x_0(i))\bmod 2$, wherein $x_0(0)=1$ and $x_0(6), x_0(5), x_0(4), x_0(3), x_0(2), x_0(1)$ have the values of 6 most significant bits of a third extended UE ID,
wherein $x_1(6), x_1(5), x_1(4), x_1(3), x_1(2), x_1(1)$ have the values of 6 least significant bits of the third extended UE ID,
wherein the second extended UE ID comprises bits from last 22th bit to the last 11th bit of the 5G S-TMSI configured for at least one third wireless terminal,
wherein u is 29 or has a value of the slot number of the first PO within a paging frame.

In an embodiment, the UE selects a public radio network temporary identifier (P-RNTI) according to the 5G S-TMSI.

In an embodiment, the UE selects a PO according to the 5G S-TMSI.

In an embodiment, the UE selects a paging search space according to the UE ID or the 5G S-TMSI.

In an embodiment, the UE selects a paging search space according to its RRC state.

In an embodiment, the UE receives the paging message according to its group ID.

In an embodiment, the present disclosure discloses a wireless communication method for a BS. The wireless communication method for the BS comprises:

The BS transmits a signal/channel,

The BS transmits a paging message according to the transmitted signal/channel.

In an embodiment, the transmitted signal/channel comprises at least one of:
a reference Signal,
a wake-up signal,
a DMRS,
a wake-up channel,
a PDCCH that schedules paging message,
a PDSCH that carries paging message,
an initialization seed ci for a signal,
an extended UE ID or UE ID for an initialization seed, or
a paging probability.

In an embodiment, the extended UE ID includes a subset of a 5G S-TMSI. For example, the sub-set of the 5G S-TMSI includes bits from the last (10+X)th bit to the last 11th bit of the 5G S-TMSI, wherein X is an integer greater than 1. In an embodiment, X=16.

In an embodiment, the initialization seed $c_{init}$ is:

$$c_{init} = (Ext\_ID * 2^{16} + N_{ID}) \bmod 2^{31}, \text{ or}$$

$$c_{init} = (2^{17}(N_{symb}^{slot} n_{s,f}^{\mu} + l + 1)(2N_{ID} + 1) + 2N_{ID}) \bmod 2^{29} + ID_{Res} * 2^{29}$$

wherein, Ext_ID is a value of the second extended UE ID, NID is a number configured by a higher layer signaling and $ID_{Res}$ is group ID or, resources ID.

In an embodiment, the initialization seed $c_{init}$ is:

$$c_{init} = (2^{17}(N_{symb}^{slot} n_{s,f}^{\mu} + l + 1)(2N_{ID} + 1) + 2N_{ID}) \bmod 2^{29}$$

wherein, $N_{ID}$ is the extended UE ID.

In an embodiment, the extended UE ID for the initialization seed $c_{init}$ is a sub-set of the 5G S-TMSI. For example, the subset of the 5G S-TMSI includes bits from the last (10+Y)th bit to the last 11th bit of the 5G S-TMSI, wherein Y is an integer greater than 1. In an embodiment, Y=16.

In an embodiment, the BS generates a group ID of a UE group according to the paging probability.

In an embodiment, a sequence of the received signal is generated according to the group ID.

In this disclosure, the extended UE ID may represent a paging ID, a UE ID, a subset of 5G S TMSI, or a P-RNTI.

In this disclosure, "do not process" may be equal to "do not expect to process", "ignore", "drop" or "discard", and vice versa.

In this disclosure, "do not receive" may be equal to "do not expect to receive".

In this disclosure, "channel" may be equal to "signal".

Based on the present disclosure, the UE is able to acknowledge whether there is a paging message for itself. As a result, unnecessary paging can be avoided, and the power consumption of the UE is reduced.

More specifically, when a BS transmits paging or a paging message, the BS may combine multiple paging messages of multiple UEs together in single transmission. The combination of multiple paging messages of the multiple UEs comprises 5G S-TMSIs, each 5G S TMSI is for each paging message. When a UE is attached to the 5G core network, the UE is assigned (e.g. configured) with a 5G S-TMSI. The combination of multiple paging messages is carried by the PDSCH. Before the transmission of paging message in the PDSCH, a PDCCH (e.g. signal in the PDCCH) that schedules the PDSCH should be transmitted.

In correspondent, when a UE receives a paging message, the UE derives a paging frame (PF) and a PO according to its UE ID. In an embodiment, the UE ID is modulo of 5G S-TMSI by 1024. That is, in binary, the UE ID is the last ten bits of its 5G S-TMSI. Because there are 48 bits in the 5G S-TMSI, some UEs (i.e., 238 UEs) have the same UE ID. That is, one paging for one specific UE may be received by another UE (i.e. another UE may successful decode the PDSCH that carrying paging message because having the same UE ID) but the later UE has to drop the received PDSCH (because its 5G S-TMSI does not match to the received PDSCH). That is, a false alarm is generated and wastes unnecessary power consumption.

Before the transmission of the paging message, the BS may transmit a RS to the UE for performing measurement, synchronization and/or automatic gain control (AGC). The RS can be implemented by a wake-up signal (WUS). For example, the UE may utilize the WUS for measuring a reference signal receiving power (RSRP), a downlink (DL) timing synchronization for good working states.

In an embodiment, the BS may transmit multiple beams for a paging message. The UE can receive multiple beams for a better performance of paging.

Embodiment 1

In the DCI, carried on the PDCCH that schedules paging message, there are N bits for each of extended UE IDs. These N bits of each of extended UE IDs can indicate whether there is a possible paging for each of corresponding UEs.

Figure 3:
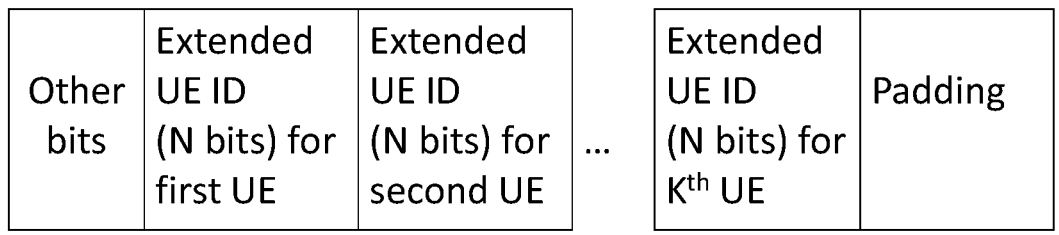
FIG. 3 shows an example the extended user equipment identifications (UE IDs) in the DCI according to an embodiment of the present disclosure.

FIG. 3 shows an example of the extended UE IDs in the DCI according to an embodiment of the present disclosure. In FIG. 3, there are K extended UE IDs and each extended UE ID has N bits (e.g., N=4). In an embodiment, each extended UE ID may have different number of bits. For example, the first extended UE ID (i.e. the extended UE ID) has 3 bits and the second extended UE ID has 5 bits. When different Extended UE IDs have different number of bits, the BS may indicate the UEs that a start position and a length of each extended UE ID. In an embodiment, the BS may indicate the UEs that the start position and end position of each Extended UE ID.

Because the payload of the DCI is limited (e.g., less than 164 bits), the total number of bits of the extended UE IDs may not excess a number Q (e.g., Q=120), i.e. $\Sigma_{i=1}^{K} N_i \leq Q$, where the $N_i$ is the number of bits of each extended UE ID. In an embodiment of each extended UE ID having the identical number of bits, the total number of bits of the extended UE IDs becomes K×N≤Q. That is, N≤Q/K or K≤Q/N. In an embodiment, K=3 and N=10. In an embodiment, the DCI has the identical number of bits of the DCI that schedules system information (i.e., the DCI with the CRC scrambled by system information radio network temporary identifier (SI-RNTI)).

In an embodiment, when the BS schedules one or more paging messages of one or more UEs, the extended UE ID in the DCI that is not scheduled should be set as a fixed value (i.e., all zeros in binary, or all ones in binary, or a known value).

Figure 4:
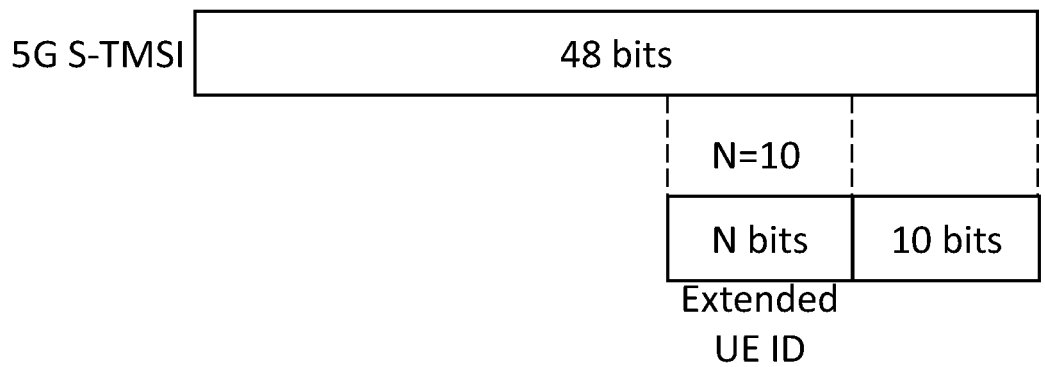
FIG. 4 shows an example of the extended UE ID according to an embodiment of the present disclosure.

In an embodiment, the extended UE ID may be bits from the last $(10+N)^{th}$ bit to the last $11^{th}$ bit of the 5G S-TMSI. For example, the extended UE ID may be bits from the last $20^{th}$ bit to the last $11^{th}$ bit of the 5G S-TMSI, where the "last" means that it is numbering from end or rightmost. That is, the decimal format of the extended UE ID may be expressed as:

$$UE\_ID\_EXT = \text{floor}((5G\_S\_TMSI \bmod 2^{(10+N)})/1024)$$
or
$$UE\_ID\_EXT = (\text{floor}(5G\_S\_TMSI/1024)) \bmod 2^N$$

where UE_ID_EXT is the extended UE ID and floor( ) is a function of getting the greatest integer that is not excess the operand and mod is a function of acquires modulo. FIG. 4 shows an example of the extended UE ID according to an embodiment of the present disclosure.

In an embodiment, when the UE receives the DCI, the UE will compare the extended UE IDs (e.g. in binary format) in the DCI with the last $(10+N)^{th}$ bit to the last $11^{th}$ bit of the 5G S-TMSI (configured for the UE). When one of the extended UE IDs in the DCI and the last $(10+N)^{th}$ bit to the last $11^{th}$ bit of the 5G S-TMSI are identical (i.e. consistent or the DCI comprises the extended UE ID of the UE), the UE may continue to receive and decode the corresponding PDSCH that carries the paging message. When the extended UE IDs in the DCI and the last $(10+N)^{th}$ bit to the last $11^{th}$ bit of the 5G S-TMSI are inconsistent (i.e. the DCI does not comprise the extended UE ID of the UE), the UE may not receive or stop receiving the corresponding PDSCH that carries the paging message. When the UE receives the corresponding PDSCH, the UE may drop (e.g. discard) the corresponding PDSCH that carries the paging message and/or may not decode the corresponding PDSCH that carries the paging message.

Based on this embodiment, the false alarm of paging can be avoided by the DCI with extended UE ID(s). Therefore, the power consumption of the UE can be saved.

Embodiment 2

In the DCI, carried on the PDCCH that schedules paging message, there are N bits for each of extended UE IDs. These N bits of each of extended UE IDs can indicate whether there is a possible paging for each of corresponding UEs.

Figure 5:
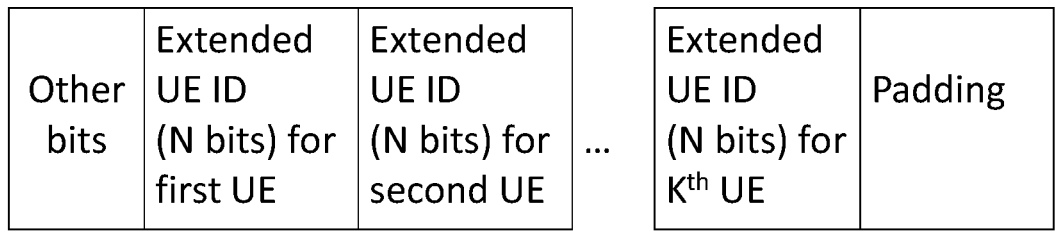
FIG. 5 shows an example of the extended UE IDs in the DL control information (DCI) according to an embodiment of the present disclosure.

FIG. 5 shows an example of the extended UE IDs in the DCI according to an embodiment of the present disclosure. In FIG. 5, there are K extended UE IDs and each extended UE ID has N bits (e.g., N=4). In an embodiment, each extended UE ID may have different number of bits. For example, the first extended UE ID (i.e. the extended UE ID) has 4 bits and the second extended UE ID has 6 bits. When different Extended UE IDs have different number of bits, the BS may indicate the UEs that a start position and a length of each extended UE ID. In an embodiment, the BS may indicate the UEs that the start position and end position of each Extended UE ID.

Because the payload of the DCI is limited (e.g., less than 164 bits), the total number of bits of the extended UE IDs may not excess a number Q (e.g., Q=130), i.e. $\Sigma_{i=1}^{K} N_i \leq Q$, where $N_i$ is the number of bits of each extended UE ID. In an embodiment of each extended UE ID having the identical number of bits, the total number of bits of the extended UE IDs becomes $K \times N \leq Q$. That is, $N \leq Q/K$ or $K \leq Q/N$. In an embodiment, K=4 and N=12. In an embodiment, the DCI has the identical number of bits of the DCI that schedules system information (i.e., the DCI with the CRC scrambled by SI-RNTI).

In an embodiment, when the BS schedules one or more paging messages of one or more UEs, the extended UE ID in the DCI that is not scheduled should be set as a fixed value (i.e., all zeros in binary, or all ones in binary, or a known value).

Figure 6:
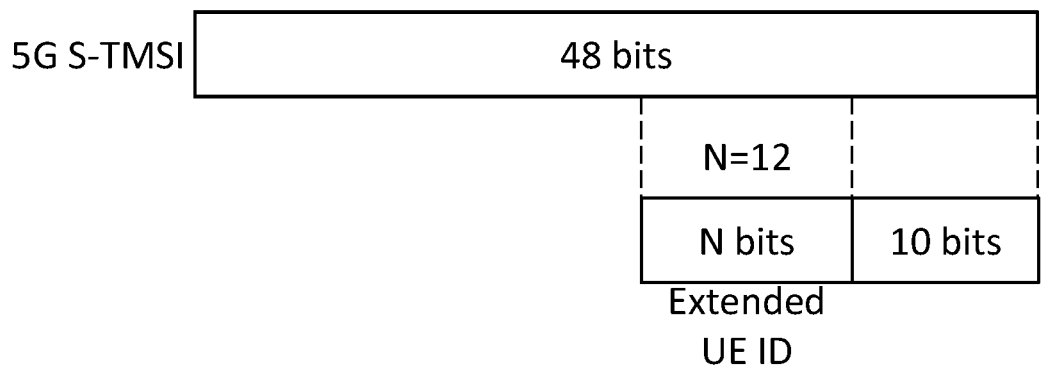
FIG. 6 shows an example of the extended UE ID according to an embodiment of the present disclosure.

In an embodiment, the extended UE ID may be bits from the last $(10+N)^{th}$ bit to the last $11^{th}$ bit of the 5G S-TMSI. For example, the extended UE ID may be bits from the last $22^{th}$ bit to the last $11^{th}$ bit of the 5G S-TMSI, where the "last" means that it is numbering from end or rightmost. That is, the decimal format of the extended UE ID is:

$$UE\_ID\_EXT = \text{floor}((5G\_S\_TMSI \bmod 2^{(10+N)})/1024)$$
or
$$UE\_ID\_EXT = (\text{floor}(5G\_S\_TMSI/1024)) \bmod 2^N$$

where UE_ID_EXT is the extended UE ID and floor( ) is a function of getting the greatest integer that is not excess the operand and mod is a function of acquires modulo. In an embodiment, the extended UE ID is 38 most significant bits (MSBs) of the 5G S-TMSI (i.e., the leftmost 38 bits). In an embodiment, the extended UE ID may be all bits of the 5G S-TMSI (i.e., 48 bits). FIG. 6 shows an example of the extended UE ID according to an embodiment of the present disclosure.

In an embodiment, the BS configures the PDSCH that carries paging message with cross slot scheduling. For example, there are two slots between the PDCCH that schedules the paging message and the corresponding PDSCH that carries the paging message.

In an embodiment, when the UE receives the DCI, the UE will compare the extended UE IDs (i.e., in binary format) in the DCI with the last $(10+N)^{th}$ bit to the last $11^{th}$ bit of the 5G S-TMSI (configured for the UE). When one of the extended UE IDs in the DCI and the last $(10+N)^{th}$ bit to the last $11^{th}$ bit of the 5G S-TMSI are identical (i.e. consistent or the DCI comprises the extended UE ID of the UE), the UE may continue to receive and decode the corresponding PDSCH that carries the paging message. When the extended UE IDs in the DCI and the last $(10+N)^{th}$ bit to the last $11^{th}$ bit of the 5G S-TMSI are inconsistent (i.e. the DCI does not comprise the extended UE ID of the UE), the UE may directly go to sleep and does not receive and/or decode the corresponding PDSCH that carries the paging message.

Based on this embodiment, the false alarm of paging can be avoided by the DCI with extended UE ID(s). In addition, the UE is able to ne prevented from receiving unnecessary PDSCH that carries the paging message. Therefore, the power consumption of the UE can be saved.

Embodiment 3

In an embodiment, the wake-up signal/channel (e.g. WUS, in the form of DCI, carried by the PDCCH) may comprise N bits for each of extended UE IDs for each of specific UEs, so as to indicate possible paging messages for the specific UEs. That is, these N bits of each of extended UE IDs in the WUS indicate whether there is a possible paging for corresponding UE.

Figure 7:
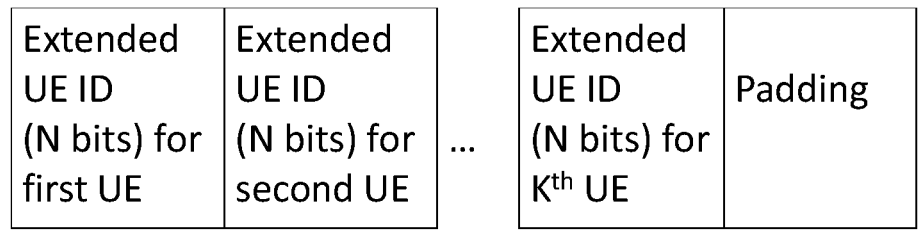
FIG. 7 shows an example of the extended UE IDs in the DCI according to an embodiment of the present disclosure.

FIG. 7 shows an example of the extended UE IDs in the WUS according to an embodiment of the present disclosure. In FIG. 7, there are K extended UE IDs and each extended UE ID has N bits (e.g., N=5). In an embodiment, each extended UE ID may have different number of bits. For example, the first extended UE ID (i.e. the extended UE ID) has 4 bits and the second extended UE ID has 6 bits. When different Extended UE IDs have different number of bits, the BS may indicate the UEs that a start position and a length of each extended UE ID. In an embodiment, the BS may indicate the UEs that the start position and end position of each extended UE ID.

Because the payload of the WUS/DCI is limited (e.g., less than 164 bits), the total number of bits of the extended UE IDs may not excess a number Q (e.g., Q=130), i.e. $\Sigma_{i=1}^{K} N_i \leq Q$, where $N_i$ is the number of bits of each extended UE ID. In an embodiment of each extended UE ID having the identical number of bits, the total number of bits of the extended UE IDs becomes K×N≤Q. That is, N≤Q/K or K≤Q/N. In an embodiment, K=4 and N=12. In an embodiment, the DCI has the identical number of bits of the DCI that schedules system information (i.e., the DCI with the CRC scrambled by SI-RNTI).

In an embodiment, when the BS schedules one or more paging messages of one or more UEs, the extended UE ID in the WUS/DCI that is not scheduled should be set as a fixed value (i.e., all zeros in binary, or all ones in binary, or a known value).

In an embodiment, the extended UE ID may be bits from the last $(10+N)^{th}$ bit to the last $11^{th}$ bit of the 5G S-TMSI. For example, the extended UE ID may be bits from the last $20^{th}$ bit to the last $11^{th}$ bit of the 5G S-TMSI, where the "last" means that it is numbering from end or rightmost. That is, the decimal format of the extended UE ID is:

$$UE\_ID\_EXT = \text{floor}((5G\_S\_TMSI \bmod 2^{(10+N)})/1024)$$

or $$UE\_ID\_EXT = (\text{floor}(5G\_S\_TMSI/1024)) \bmod 2^N$$

where UE_ID_EXT is the extended UE ID and floor( ) is a function of getting the greatest integer that is not excess the operand and mod is a function of acquires modulo.

Figure 8:
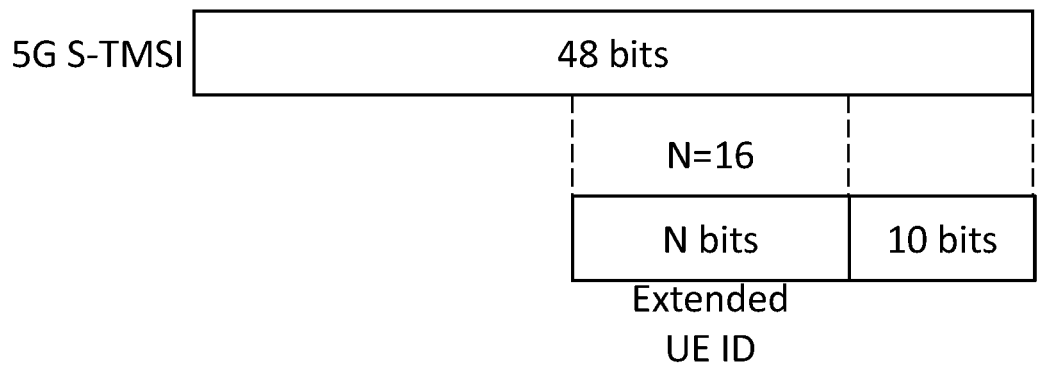
FIG. 8 shows an example of the extended UE ID according to an embodiment of the present disclosure.

In an embodiment of N=16, the extended UE ID may be that shown in FIG. 8.

Figure 9:
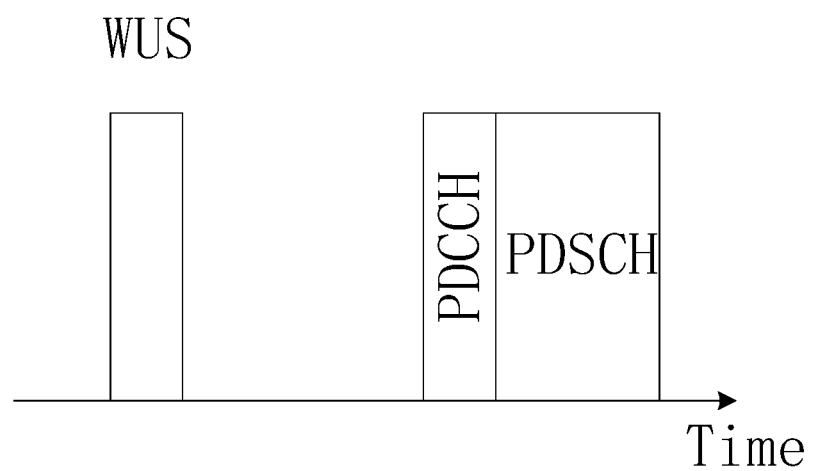
FIG. 9 shows an example of a timing diagram of a wake-up signal (WUS), a PDCCH and a PDSCH according to an embodiment of the present disclosure.

In an embodiment, when the UE receives the WUS/DCI, the UE will compare the extended UE IDs (i.e., in binary format) in the WUS/DCI with the last $(10+N)^{th}$ bit to the last $11^{th}$ bit of the 5G S-TMSI (configured for the UE). When one of the extended UE IDs in the WUS/DCI and the last $(10+N)^{th}$ bit to the last $11^{th}$ bit of the 5G S-TMSI are identical (i.e. consistent or the WUS/DCI comprises the extended UE ID of the UE), the UE may continue to receive and decode the corresponding PDSCH that carries the paging message. When the extended UE IDs in the WUS/DCI and the last $(10+N)^{th}$ bit to the last $11^{th}$ bit of the 5G S-TMSI are inconsistent (i.e. the WUS/DCI does not comprise the extended UE ID of the UE), the UE does not receive the paging message. FIG. 9 shows an example of a timing diagram of the WUS, the PDCCH and the PDSCH according to an embodiment of the present disclosure.

In an embodiment, when the UE does not receive the WUS/DCI (e.g. fails to successfully decode the WUS/DCI), then the UE may receive the paging message, e.g., during the next DRX-ON period of the paging cycle. That is, the UE of the present disclosure may receive the PDCCH that scheduling paging message and/or PDSCH that carries paging message as a legacy UE (i.e., Rel-15/Rel-16 UE).

Based on this embodiment, the false alarm of paging (including false alarm of the PDCCH that scheduling paging message and/or the PDSCH that carries paging message) can be avoided. Thus, the power consumption can be saved.

Embodiment 4

In the DCI (carried on the PDCCH) that schedules the paging message, the CRC bits are scrambled by the P-RNTI.

In an embodiment, when a BS schedules at least one paging messages of at least one UE, the CRC bits in the corresponding DCI are scrambled by the extended UE ID after being scrambled by the P-RNTI. In an embodiment, a value of the P-RNTI may be different from a pre-defined value configured for the P-RNTI (e.g. FFFE in hex). For example, the value of P-RNTI may be FFFD in hex. In an embodiment, the A (which is an integer, e.g. A=8) MSB(s) of the CRC bits (i.e., the leftmost A bits, or left first to left $A^{th}$ bit) are scrambled by A bits of the extended UE ID. In an embodiment, the A (e.g. A=7) least significant bit(s) (LSB(s)) of the CRC bits (i.e., the rightmost A bits, or right first to right $A^{th}$ bit) are scrambled by A bits of the extended UE ID. In an embodiment, the A (e.g. A=7) MSB(s) of the CRC bits (i.e., the leftmost A bits, or left first to left $A^{th}$ bit) are scrambled by A bits of the extended UE ID while the $(A+1)^{th}$ bit is toggled (i.e., the $(A+1)^{th}$ bit is scrambled by 1). In an embodiment, the scrambling operation may be XOR or modulo of 2.

Figure 10:
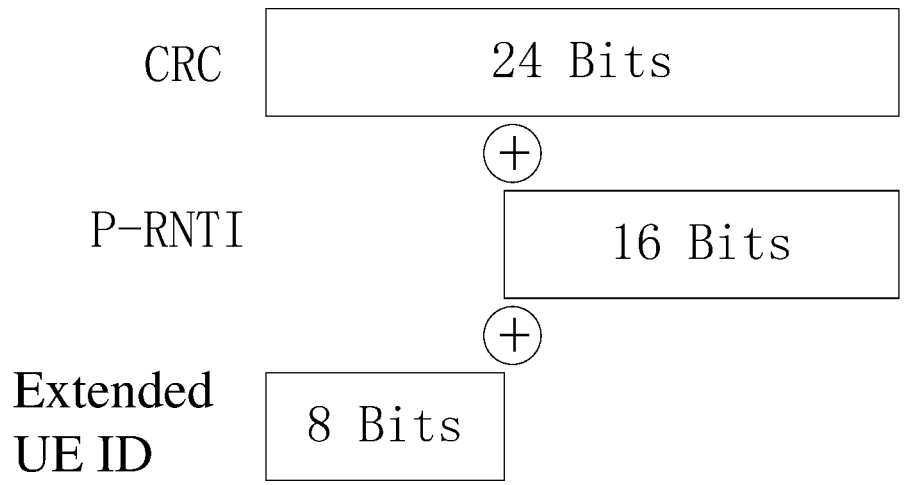
FIG. 10 shows an example of scrambling the CRC bits according to an embodiment of the present disclosure.

FIG. 10 shows an example of scrambling the CRC bits according to an embodiment of the present disclosure, wherein the circle with a plus sign represents performing the scrambling operation. In FIG. 10, the CRC bits have 24bits and the rightmost 16 bits of the CRC bits are scrambled by the P-RNTI (which is 16 bits). Next, the left most 8 bits of the CRC bits are scrambled by the extended UE ID (8 bits).

Figure 11:
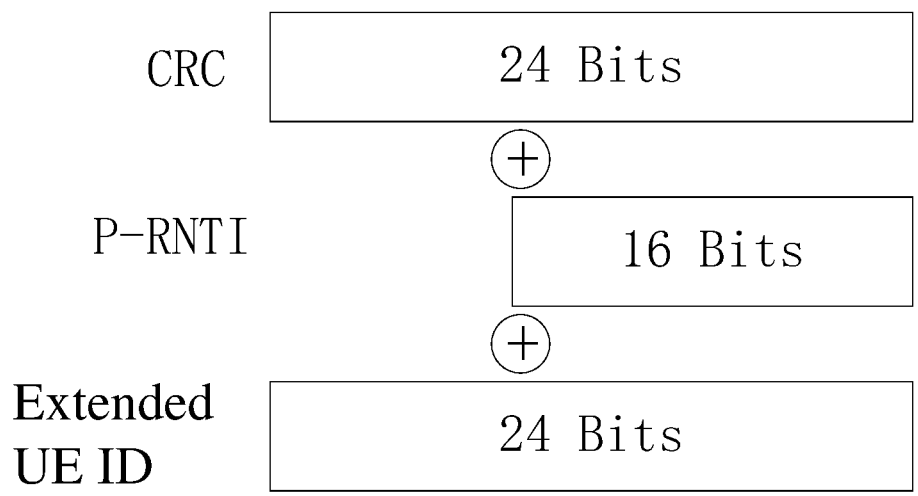
FIG. 11 shows an example of scrambling the CRC bits according to an embodiment of the present disclosure.

FIG. 11 shows an example of scrambling the CRC bits according to an embodiment of the present disclosure, wherein the circle with a plus sign represents performing the scrambling operation. In FIG. 11, the rightmost 16 bits of the CRC bits are scrambled by the P-RNTI (16 bits). After being scrambled by the P-RNTI, all of the CRC bits are scrambled by the extended UE ID which is 24 bits.

Figure 12:
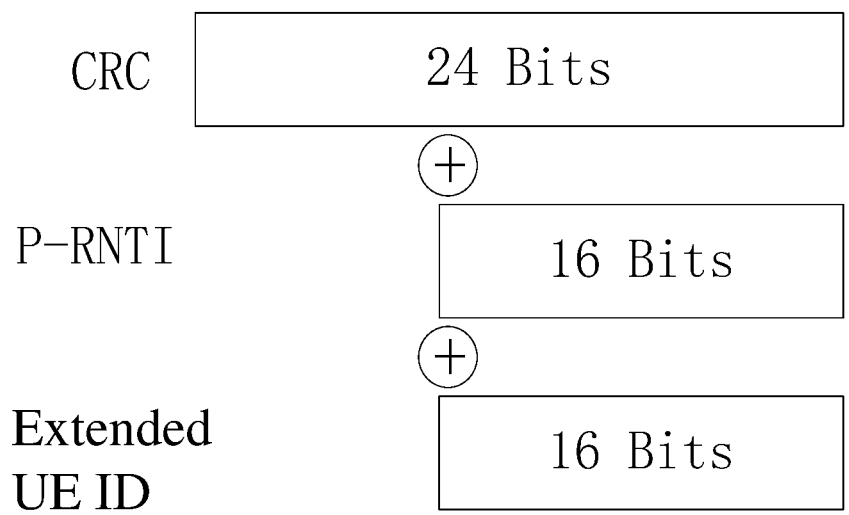
FIG. 12 shows an example of scrambling the cyclic redundancy check (CRC) bits according to an embodiment of the present disclosure.

FIG. 12 shows an example of scrambling the CRC bits according to an embodiment of the present disclosure, wherein the circle with a plus sign represents performing the scrambling operation. In FIG. 12, the rightmost 16 bits of the CRC bits are scrambled by the P-RNTI (16 bits). After being scrambled by the P-RNTI, the rightmost 16 bits of the CRC bits are scrambled again by the extended UE ID which is 16 bits.

Figure 13:
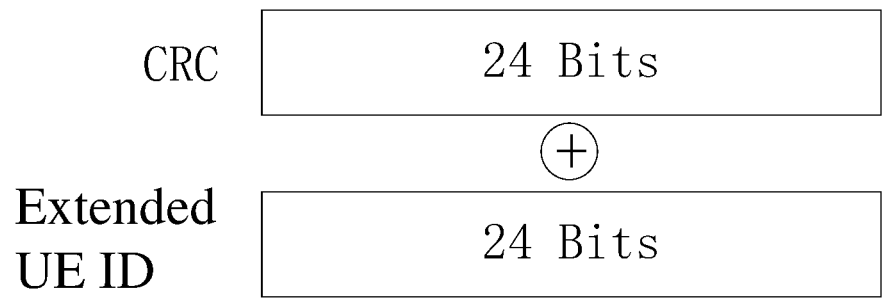
FIG. 13 shows an example of scrambling the CRC bits according to an embodiment of the present disclosure.

FIG. 13 shows an example of scrambling the CRC bits according to an embodiment of the present disclosure, wherein the circle with a plus sign represents performing the scrambling operation. In FIG. 13, the CRC bits are only scrambled by the extended UE ID (24 bits).

In an embodiment, the extended UE ID may comprises bits from the last $(10+A)^{th}$ bit to the last 11th bit of the 5G S-TMSI. For example, the extended UE ID may be bits from the last 18th bit to the last 11th bit of the 5G S-TMSI (i.e. A=8). In another example, the extended UE ID can be the last A bits of the 5G S-TMSI. In still another example, the extended UE ID may be the first A bits of the 5G S-TMSI.

Figure 14:
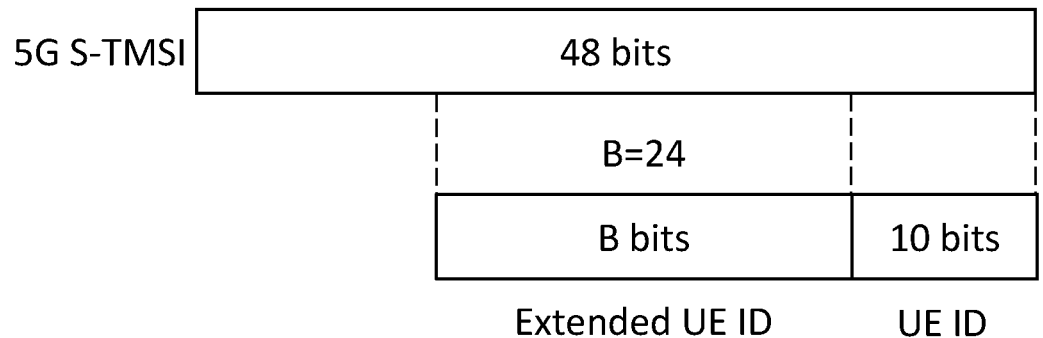
FIG. 14 shows an example of the extended UE ID according to an embodiment of the present disclosure.

FIG. 14 shows an example of the extended UE ID according to an embodiment of the present disclosure. In FIG. 14, the extended UE ID comprises bits from the last $(10+B)^{th}$ bit to the last $11^{th}$ bit of 5G S-TMSI, e.g. B is an integer greater than 1. In this embodiment, the extended UE ID comprises bits from the last 34$^{th}$ bit to the last 11$^{th}$ bit of the 5G S-TMSI (i.e. B=24). In an example, the extended UE ID may be the last B bits of the 5G S-TMSI. In another example, the extended UE ID may be the first B bits of the 5G S-TMSI.

In an embodiment, when the UE decodes the DCI (on the PDCCH) that schedules paging message, the UE de-scrambles the CRC bits with UE's last (10+B)$^{th}$ bit to the last 11$^{th}$ bit of its 5G S-TMSI (e.g., from the last 34$^{th}$ bit to the last 11$^{th}$ bit of the 5G S-TMSI (i.e. B=24)). Next, the UE de-scrambles the CRC bits with the P-RNTI again. When the final de-scrambled CRC is identical (i.e. consistent) to the CRC bits calculated based on data of the DCI the UE determine there is a possible paging message for itself. Thus, the UE continues to receive and decode the corresponding PDSCH that carries the paging message. When the final de-scrambled CRC is inconsistent to the CRC calculated according to the data of the DCI, the UE determines that there is no paging message for itself and stops receiving and/or decoding (signal in) the corresponding PDSCH that carries the paging message (e.g. the UE may receive and discard the signal in the PDSCH). Therefore, the power consumption of the UE is saved.

In an embodiment, when the UE decodes the DCI (on the PDCCH) that schedules paging message, the UE de-scrambles the CRC bits with UE's last (10+B)$^{th}$ bit to the last 11$^{th}$ bit of its 5G S-TMSI (e.g., from the last 34$^{th}$ bit to the last 11$^{th}$ bit of 5G S-TMSI where B=24). When the de-scrambled CRC is identical to the CRC bits calculated based on data of the DCI, the UE determine there is a possible paging message for itself. Thus, the UE continues to receive and decode the corresponding PDSCH that carries the paging message. When the final de-scrambled CRC is inconsistent with the CRC calculated according to the data of the DCI, the UE determines that there is no paging message for itself and stops receiving and/or decoding the corresponding PDSCH that carries the paging message. Therefore, the power consumption of the UE is saved.

In an embodiment, for a UE under the RRC inactive state RRC_Inactive, the CRC bits may scrambled by a cell RNTI (i.e. C-RNTI).

In an embodiment, for a UE under the RRC inactive state RRC_Inactive, the CRC bits may be scrambled by the P-RNTI and the scrambled CRC bits may be scrambled by the C-RNTI again.

In an embodiment, for a UE under the RRC inactive state RRC_Inactive, the CRC bits may be scrambled by the C-RNTI and the scrambled CRC bits may be scrambled by the P-RNTI again.

In an embodiment, for a UE under the RRC idle state RRC_Idle, if the C-RNTI configured for the UE is not released, the UE may apply the abovementioned methods of scrambling the CRC bits based on the C-RNTI and/or the P-RNTI.

Note that, the extended UE ID or the C-RNTI may also be used to scramble the DCI that schedules paging message. As a result, the false alarm is prevented and the power consumption of the UE is reduced.

Embodiment 5

In an embodiment, when the PDCCH that schedules paging message is transmitted by the BS, the DMRS may be scrambled or initialized by some information as the following:

$$r_l(m) = \frac{1}{\sqrt{2}}(1 - 2 \cdot c(2m)) + j\frac{1}{\sqrt{2}}(1 - 2 \cdot c(2m+1))$$

Figure 15:
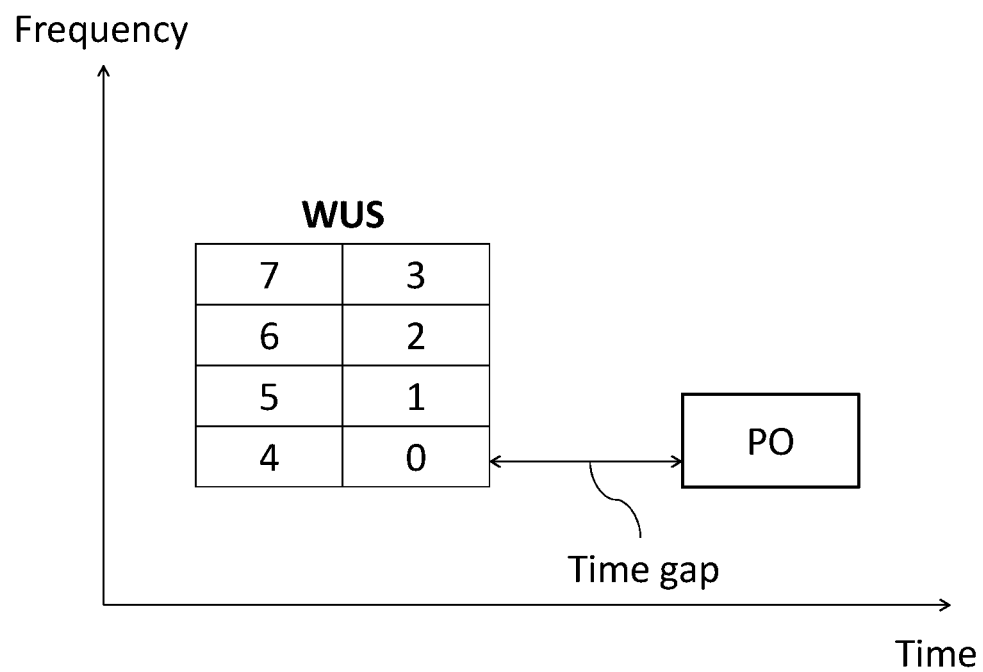
FIG. 15 shows an example of resource identifications configured for a wake-up signal according to an embodiment of the present disclosure.

In an embodiment, the sequence c(i) is initialized as the following initialization seed $c_{init}$:

$$c_{init} = (2^{17}(N_{symb}^{slot} n_{s,f}^{\mu} + l + 1)(2N_{ID}+1) + 2N_{ID}) \mod 2^{31}$$

or $$c_{init} = (2^{17}(N_{symb}^{slot} n_{s,f}^{\mu} + l + 1)(2N_{ID}+1) + 2N_{ID}) \mod 2^{29} + ID_{Res} * 2^{29}$$

where, $N_{symb}^{slot}$ is the number of symbols per slot, $n_{s,f}^{\mu}$ is a slot number within a frame for a subcarrier spacing configuration u, I is a symbol number within a slot, $N_{ID}$ is UE's extended UE ID. In an embodiment, the length of extended UE ID is 16 bits. In an embodiment, the extended UE ID comprises bits from the last (10+C)$^{th}$ bit to the last 11$^{th}$ bit of the 5G S-TMSI, e.g. C is an integer greater than 1. For example, the extended UE ID may be bits from the last 26$^{th}$ bit to the last 11$^{th}$ bit of the 5G_S-TMSI (i.e. C=16). In an embodiment, the extended UE ID is an integer of corresponding binary bits from the last (10+C)$^{th}$ bit to the last 11$^{th}$ bit of the 5G S-TMSI, $ID_{Res}$ is a group ID (i.e., the ID of a group to which the UE belongs) or, a resources ID (i.e., the ID of a resource configured for the WUS). FIG. 15 shows an example of the resource IDs according to an embodiment of the present disclosure. In FIG. 15, there are 8 resources configured for the WUS (hereinafter, WUS resources) and each of the WUS resources is labeled with one of WUS resource IDs (e.g. indexes) 0, 1, 2, 3, 4, 5, 6 and 7. As shown in FIG. 15, the WUS resources are labeled first in an order of the time domain and then in an order of the frequency domain. In an embodiment, the WU resources may be labeled first in the order of the frequency domain and then in the order of the time domain. In addition, there is a time gap between the WUS and a corresponding PO in FIG. 15. In an embodiment, the PO may be a DRX-ON cycle. In an embodiment, the WUS resources may have different WUS resource IDs when the time gap between the WUS and the PO changes. In an embodiment, the WUS resources may be a resource in the time domain, the frequency domain and/or a search space for the PDCCH. In an embodiment, the WUS resource IDs may be one of 0, 1, 2, 3, . . . , 49 or 50. In an embodiment, different WUS resource IDs may h$^a$ve different base se$^{qu}$ence. In an embodiment, different WUS resource IDs may have different initial seeds $c_{init}$.

In addition, the WUS resource can be a resource in time domain, frequency domain, or a search space for PDCCH (e.g., this ID can be 0,1,2,3, . . . , 49, 50). In addition, different resource ID may have different base sequence. In addition, different resource ID may have different initial seed $c_{init}$.

In an embodiment, sequence c(i) is initialized as the following initialization seed $c_{init}$:

$$c_{init} = UE\_ID\_Ext \mod 2^{31}$$

where, UE_ID_Ext is the extended UE ID. In this embodiment, the extended UE ID may be the 5G S-TMSI or the first bit to the 38$^{th}$ bit (i.e., 38 MSBs) of the 5G S-TMSI.

In an embodiment, sequence c(i) is initialized as the following initialization seed $c_{init}$:

$$c_{init} = UE\_ID\_Ext$$

where, UE_ID_Ext is the extended UE ID. In this embodiment, the extended UE ID may be the 5G S-TMSI or bits from the last $(10+D)^{th}$ bit to the last $11^{th}$ bit of the 5G S-TMSI, e.g. D is an integer greater than 1. For example, the extended UE ID may be bits from the last $41^{st}$ bit to the last $11^{th}$ bit of the 5G S-TMSI (i.e. D=31).

In an embodiment, sequence c(i) is initialized as the following initialization seed $c_{init}$:

$$c_{init}=(UE\_ID\_Ext*2^{16}+N_{ID}) \bmod 2^{31}$$

where, UE_ID_Ext is the extended UE ID. In this embodiment, the extended UE ID may be the 5G S-TMSI or bits from the last $(10+E)^{th}$ bit to the last $11^{th}$ bit of the 5G S-TMSI, e.g. E is an integer greater than 1. For example, the extended UE ID may be bits from the last $25^{th}$ bit to the last $11^{th}$ bit of the 5G S-TMSI (i.e. E=15). In an embodiment, the extended UE ID is the integer of corresponding binary bits from the last $(10+E)^{th}$ bit to the last $11^{th}$ bit of 5G S-TMSI. In an embodiment, $N_{ID}$ is configured by higher layer. In an embodiment, $N_{ID}$ has a value of the P-RNTI (e.g. FFFE in hex).

In an embodiment, the method of generating the DMRS on the PDCCH that schedules the paging message can also be applied to generating DMRS on the PDSCH that carries the paging message.

In an embodiment, when the UE de-modulates the DMRS of the PDCCH that schedules the paging message, the UE initials the DMRS sequence with corresponding bits of the 5G S-TMSI configured for the UE. In an embodiment, when the UE de-modulates the DMRS of the PDCCH that schedules the paging message, the UE initials a local DMRS sequence with corresponding bits of its 5G S-TMSI.

In an embodiment, the UE performs a correlation between the received DMRS sequence and the local DM-RS sequence initialized with corresponding bits of the 5G S-TMSI configured for the UE. When a correlation peak is low (i.e. the UE fails to receive (decode) the DMRS or the DMRS is inconsistent with the extended UE ID of the UE), the UE does not decode the PDCCH that schedules paging message, does not receive the PDSCH that carries paging message and/or does not decode PDSCH that carries paging message. In addition, the UE may stop processing a paging receiving procedure. When the correlation peak is high (i.e. the UE successfully receive (decode) the DMRS or the DMRS is consistent with the extended UE ID of the UE), the UE continues to perform the paging receiving procedure.

In this embodiment, when the DMRS in the PDCCH is not initialized by the corresponding extended UE ID, the correlation peak acquired by the UE is low. As a result, the UE is able to accordingly determine whether to perform the operation of decoding and/or receiving the PDCCH and/or the PDSCH. Hence, the false alarm of paging receiving can be reduced and the power consumption can be saved.

Embodiment 6

In an embodiment, the CRC bits of DCI carried by the PDCCH that scheduling the paging message is scrambled by the P-RNTI. In the DCI, there are 8 bits that carry short messages ((hereinafter short message bits)). In an embodiment, F bits of short message bits may be set as the extended UE ID with F bits. In an embodiment, all of short message bits are set as the extended UE ID (i.e. F=8). In this embodiment, the extended UE ID may be bits from the last $(10+F)^{th}$ bit to the last $11^{th}$ bit of 5G S-TMSI. That is, the extended UE ID may be bits from the last $18^{th}$ bit to the last $11^{th}$ bit of 5G S-TMSI. In an embodiment, the last G bits of the short message bits can be set as the extended UE ID with G bits (e.g., G=6), where the extended UE ID may be bits from the last $(10+G)^{th}$ bit to the last $11^{th}$ bit of the 5G S-TMSI. For example, the extended UE ID can be bits from the last $16^{th}$ bit to the last $11^{th}$ bit of 5G S-TMSI (i.e. G=6). In an embodiment, the last H bits of the short message bits can be set as the extended UE ID with H bits (e.g., H=4), where The extended UE ID can be bits from the last $(10+H)^{th}$ bit to the last $11^{th}$ bit of the 5G S-TMSI. For example, the extended UE ID may be bits from the last $14^{th}$ bit to the last $11^{th}$ bit of the 5G S-TMSI (i.e. H=4).

In an embodiment, when a short messages indicator of the DCI whose CRC bits are scrambled by the P-RNTI having a value of "01", the F bits of short message bits can be set as the extended UE ID with F bits. In an embodiment, all short message bits are set as the extended UE ID with 8 bits. For example, the extended UE ID may be bits from the last $18^{th}$ bit to the last $11^{th}$ bit of 5G S-TMSI.

In an embodiment, when the short messages indicator of the DCI whose CRC bits are scrambled by the P-RNTI having a value of "10" or "11", the last G bits of short message bits may be set as the extended UE ID with G bits (e.g., G=6), where the extended UE ID may be the last $(10+G)^{th}$ bit to the last $11^{th}$ bit of 5G_S_TMSI. For example, the extended UE ID may be bits from the last $16^{th}$ bit to the last $11^{th}$ bit of 5G_S_TMSI (i.e. G=6).

In an embodiment, when the short messages indicator of the DCI whose CRC bits are scrambled by the P-RNTI having a value of "10" or "11", the last G bits of short message bits may be set as the extended UE ID with G bits (e.g., G=6), where the extended UE ID may be bits from the last G bits of the UE ID or first G bits of the UE ID. For example, the UE ID is the last 10 bits of the 5G S-TMSI.

In an embodiment, there are 6 bits of reserved bits in the DCI whose CRC is scrambled by the P-RNTI. In this embodiment, J bits of the reserved bits in the DCI may be set as the extended UE ID with J bits. In an embodiment, the extended UE ID may be bits from the last $(10+J)^{th}$ bit to the last $11^{th}$ bit of the 5G S-TMSI. For example, the extended UE ID may be bits from the last $16^{th}$ bit to the last $11^{th}$ bit of 5G_S_TMSI (i.e. J=6). In an embodiment, the first J bits of the reserved bits in the DCI are set as the extended UE ID with J bits. For example, the extended UE ID may be bits from the last $14^{th}$ bit to the last $11^{th}$ bit of the 5G S-TMSI (i.e. J=4). In an embodiment, the last J bits of the reserved bits in the DCI is set as the extended UE ID with J bits. For example, the extended UE ID may be bits from the last $14^{th}$ bit to the last $11^{th}$ bit of the 5G S-TMSI (i.e. J=4).

In an embodiment, the J bits of the reserved bits are set as the extended UE ID with J bits. In this embodiment, the extended UE ID may be the last J bit of the UE ID. For example, the extended UE ID may be the last 6 bit of UE ID (i.e. J=6). In an embodiment, the extended UE ID may be the first J=6 bit of the UE ID. In an embodiment, the UE ID is the last 10 bits of the 5G S-TMSI.

In an embodiment, after decoding the PDCCH that scheduling the paging message, the UE compares the reserved bits or the short message bits with corresponding bits in the 5G S-TMSI. When the result of comparing indicates the reserved bits or the short message bits are identical (i.e. consistent) to the corresponding bits in the 5G S-TMSI, the UE receives and decodes the later PDSCH that carries the paging message. If the reserved bits or the short message bits are inconsistent to (i.e. different from) the corresponding bits in the 5G S-TMSI, the UE stops receiving PDSCH that carrying paging message and/or stops decoding the PDSCH that carries paging message.

In an embodiment, the reserved bits and/or the short message bits may indicate multiple sub-groups of UE(s) to receive the paging message. For example, there may be K=3 sub-groups and each of sub-groups has two bits of indicator. The two bits of indicator may be a sub-set of the UE ID or the 5G S-TMSI.

Embodiment 7

Figures 16, 17:
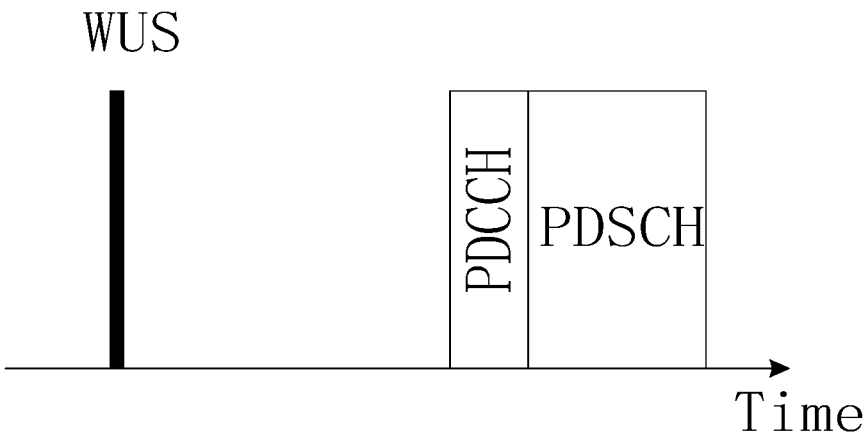
FIG. 16 shows an example of a wake-up signal according to an embodiment of the present disclosure.
FIG. 17 shows an example of associating the extended UE ID with one P-RNTI according to an embodiment of the present disclosure.

In an embodiment, the BS may indicate possible paging message via a WUS which is also a kind of reference signal as shown in FIG. 16. During the generation of the WUS, a sequence of the WUS is initialized first. The sequence or the initialization of sequence of the WUS is able to carry some information. In an embodiment, the extended UE ID with W bits may be utilized to generate or to initialize the sequence or the initialization of sequence of the WUS.

In an embodiment, the WUS may carry at least one of a paging message indication (i.e. indicating whether there is paging or not), the UE ID, the extended UE ID or a sub-group ID for paging receiving (e.g., whether there is paging or not for one sub-group). In an embodiment, the WUS may be used for at least one of DL synchronization, an automatic gain control (AGC) or a physical layer measurement (e.g., RSRP). In an embodiment, the WUS is transmitted before the PO (e.g., Q milliseconds before the first PO of a paging, e.g. Q=3). In an embodiment, the WUS is transmitted P slot(s) before a synchronization signal block (SSB) before the first PO. For example, the WUS is transmitted 3 slots before the last SSB (i.e. P=3) before the first PO).

In an embodiment, the WUS may be expressed as a first WUS sequence shown as the following:

$$d_{WUS}(n)=[1-2x_0((n+m_0) \bmod 127)][1-2x_1((n+m_1) \bmod 127)],$$

$$m_0 = 15\left\lfloor \frac{N_{ID}^{(1)}}{112} \right\rfloor + 5N_{ID}^{(2)},$$

$$m_1 = N_{ID}^{(1)} \bmod 112,$$

and $0 \leq n < 127$ wherein $\lfloor \cdot \rfloor$ fetches the greatest integer that does not excess the operand, $N_{ID}^{(1)} \in \{0, 1, \ldots, 335\}$ which is a first cell ID, $N_{ID}^{(2)} \in \{0, 1, 2\}$ which is a second cell ID, and x(n) is as the following:

$$x_0(i+7)=(x_0(i+4)+x_0(i)) \bmod 2,$$

$$x_1(i+7)=(x_1(i+4)+x_1(i)) \bmod 2,$$

wherein $[x_0(6), x_0(5), x_0(4), x_0(3), x_0(2), x_0(1), x_0(0)]$ and $[x_1(6), x_1(5), x_1(4), x_1(3), x_1(2), x_1(1), x_1(0)]$ have the values of the extended UE ID with 7bits. For example, extended UE ID may be bits from the last 17th bit to the last 11th bit of the 5G S-TMSI.

In an embodiment, $[x_0(6), x_0(5), x_0(4), x_0(3), x_0(2), x_0(1), x_0(0)]$ and $[x_1(6), x_1(5), x_1(4), x_1(3), x_1(2), x_1(1), x_1(0)]$ have the values of bits from the last 17th bit to the last 11th bit of the 5G S-TMSI.

In an embodiment, $x_0(0)=1$, $x_1(0)=1$, and $x_0(6), x_0(5), x_0(4), x_0(3), x_0(2), x_0(1)$ and $x_1(6), x_1(5), x_1(4), x_1(3), x_1(2), x_1(1)$ have the values of the extended UE ID with 6 bits. For example, the extended UE ID may be bits from the last 16th bit to the last 11th bit of the 5G S-TMSI.

In an embodiment, $x_0(0)=1$, $x_1(0)=1$, and $x_0(6), x_0(5), x_0(4), x_0(3), x_0(2), x_0(1)$ and $x_1(6), x_1(5), x_1(4), x_1(3), x_1(2), x_1(1)$ have the values of 6 MSBs of the UE ID. For example, the UE ID may be the last 10 bits of the 5G S-TMSI.

In an embodiment, $x_0(0)=1$, $x_1(0)=1$, and $x_0(6), x_0(5), x_0(4), x_0(3), x_0(2), x_0(1)$ and $x_1(6), x_1(5), x_1(4), x_1(3), x_1(2), x_1(1)$ come from the last 16th bit to the last 11th bit of the 5G S-TMSI.

In an embodiment, $[x_0(6), x_0(5), x_0(4), x_0(3), x_0(2), x_0(1), x_0(0)]$ have the values of 7 MSB(s) of the extended UE ID, and $[x_1(6), x_1(5), x_1(4), x_1(3), x_1(2), x_1(1), x_1(0)]$ have the values of 7 LSBs of the extended UE ID. In this embodiment, the extended UE ID may be bits from the last 24th bit to the last 11th bit of the 5G S-TMSI.

In an embodiment, $x_0(0)=1$,
$x_0(6), x_0(5), x_0(4), x_0(3), x_0(2), x_0(1)$ have the values of 6 MSBs of the extended UE ID,
$x_1(0)=1$, and
$x_1(6), x_1(5), x_1(4), x_1(3), x_1(2), x_1(1)$ have the values of 6 LSBs of the extended UE ID. For example, the extended UE ID may be bits from the last 22th bit to the last 11th bit of the 5G S-TMSI.

In an embodiment, $x_0(0)=1$; $x_0(1)$ and $x_0(2)$ have the values of two bits of the UE ID (e.g. 2 LSBs of the UE ID); and $x_0(6), x_0(5), x_0(4), x_0(3)$ are all zero. In addition, $x_1(0)=1$; $x_1(1)$ and $x_1(2)$ have the values of two bits of the UE ID (e.g. 2 LSBs of the UE ID); and $x_1(6), x_1(5), x_1(4), x_1(3)$ are all zero. The UE ID are the last 10 bits of the 5G S-TMSI.

In an embodiment, at least one bit of the initialization seeds (i.e., $x_0(0) \ldots x_0(6)$ and $x_1(0) \ldots x_1(6)$) has the value of (e.g. associated to, related to, indicating) time domain resources (e.g. resources of the WUS, resources of search space). For example, $x_0(0)=1$, $x_0(1)$ has the value of one bit of time domain resources (e.g., "0" for the first resource and "1" for the second resource), $x_0(6), x_0(5), x_0(4), x_0(3), x_0(2)$ are all zeros, $x_1(0)=1$, $x_1(1)$ has the value of one bit of time domain resources, and $x_1(6), x_1(5), x_1(4), x_1(3), x_1(2)$ are all zeros.

In an embodiment, at least one bit of the initialization seeds (i.e., $x_0(0) \ldots x_0(6)$ and $x_1(0) \ldots x_1(6)$) has the value of (e.g. associated to, related to, indicating) frequency domain resources (e.g. resources of the WUS, resources of search space). For example, $x_0(0)=1$, $x_0(1)$ and $x_0(2)$ have the values of two bits of frequency domain resources (e.g., "00" for the first resource, "01" for the second resource, "10" for the third resource and "11" for the fourth resource), $x_0(6), x_0(5), x_0(4), x_0(3)$ are all zeros, $x_1(0)=1$, $x_1(1)$ and $x_1(2)$ have the values of two bits of frequency domain resources, and $x_1(6), x_1(5), x_1(4), x_1(3)$ are all zeros.

In an embodiment, $[x_0(6), x_0(5), x_0(4), x_0(3), x_0(2), x_0(1), x_0(0)]$ have the values of the last $17^{th}$ bit to the last $11^{th}$ bit of the 5GS-TMSI and $[x_1(6), x_1(5), x_1(4), x_1(3), x_1(2), x_1(1), x_1(0)]$ have the values of the last 24th bit to the last 18th bit of the 5G S-TMSI.

In an embodiment, $x_0(0)=1$,
$x_0(6), x_0(5), x_0(4), x_0(3), x_0(2), x_0(1)$ have the values of the last 16th bit to the last $11^{th}$ bit of the 5GS-TMSI,
$x_1(0)=1$, and
$x_1(6), x_1(5), x_1(4), x_1(3), x_1(2), x_1(1)$ have the values of the last 22th bit to the last 17th bit of the 5GS-TMSI.

In an embodiment, $x_0(1)=0$, $x_0(0)=1$,
$x_0(6), x_0(5), x_0(4), x_0(3), x_0(2)$ have the values of the last 15th bit to the last 11th bit of the 5GS-TMSI,
$x_1(1)=0$, $x_1(0)=1$, $x_1(6)$, $x_1(5)$, $x_1(4)$, $x_1(3)$, $x_1(2)$ have the values of the last 20th bit to the last 16th bit of the 5GS-TMSI.

In an embodiment, $x_0(1)=0$, $x_0(0)=1$, $x_0(6)$, $x_0(5)$, $x_0(4)$, $x_0(3)$, $x_0(2)$ have the values of 5 LSBs of the UE ID, $x_1(1)=0, x_1(0)=1$, $x_1(6)$, $x_1(5)$, $x_1(4)$, $x_1(3)$, $x_1(2)$ have the values of the 5 MSBs of the UE ID. In this embodiment, the UE ID may be the 10 LSBs (i.e. the last 10 bits or the rightmost 10 bits) of the 5G S-TMSI.

In an embodiment, $x_0(1)=0, x_0(0)=1$, $x_1(1)=0, x_1(0)=1$, and both $x_0(6), x_0(5), x_0(4), x_0(3), x_0(2)$ and $x_1(6)$, $x_1(5)$, $x_1(4)$, $x_1(3)$, $x_1(2)$ have the values of 5MSBs of the UE ID. In this embodiment, the UE ID may be the 10 LSBs of the 5G S-TMSI.

In an embodiment, the WUS may be expressed as a second WUS sequence shown as the following:

$$d_{WUS}(n)=[1-2x_0((n+m_0)\bmod 127)][1-2x_1((n+m_1)\bmod 127)]\cdot e^{j\pi un(n+1)/131}$$

$$m_0 = 15\left\lfloor \frac{N_{ID}^{(1)}}{112} \right\rfloor + 5N_{ID}^{(2)},$$

$m_1 = N_{ID}^{(1)} \bmod 112$, and $0 \leq n < 127$ wherein $\lfloor \cdot \rfloor$ fetches the greatest integer that does not excess the operand, $N_{ID}^{(1)} \in \{0, 1, \ldots, 335\}$ which is a first cell ID, $N_{ID}^{(2)} \in \{0, 1, 2\}$ which is a second cell ID, and u=29. In an embodiment, u has the value of the slot number of the first PO within a PF. In an embodiment, u has the value of one plus the slot number of the first PO within a PF. In an embodiment, u has the value of decimal format of the extended UE ID. In an embodiment, u has the value of one plus the decimal format of the extended UE ID. The other variables and their value may be referred to the above embodiments and are not narrated herein for brevity.

In an embodiment, the WUS may be expressed as a third WUS sequence shown as the following:

$$d_{WUS}(n)=[1-2x_0((n+m_0)\bmod 127)][1-2x_1((n+m_1)\bmod 127)]$$

$$m_0 = \left(15\left\lfloor \frac{N_{ID}^{(1)}}{112} \right\rfloor + 5N_{ID}^{(2)} + UE\_ID\_Ext\right) \bmod 31,$$

$m_1 = (N_{ID}^{(1)} + UE\_ID\_Ext) \bmod 112$, and $0 \leq n < 127$ or $$d_{WUS}(n)=[1-2x_0((n+m_0)\bmod 127)][1-2x_1((n+m_1)\bmod \mathbf{127})]$$

$$m_0 = 15\left\lfloor \frac{N_{ID}^{(1)}}{112} \right\rfloor + 5N_{ID}^{(2)} + UE\_ID\_Ext,$$

$m_1 = (N_{ID}^{(1)} \bmod 112) + UE\_ID\_Ext$, and $0 \leq n < 127$ where, UE_ID_Ext is the (decimal) value of the extended UE ID in decimal format. In an embodiment, the extended UE ID may be bits from the last (10+V)th bit to the last 11th bit of the 5G S-TMSI. For example, the extended UE ID can be bits from the last 20th bit to the last 11th bit of 5G S-TMSI (i.e. V=10).

In an embodiment, the WUS may be expressed as a fourth WUS sequence shown as the following:

$$d_{WUS}(n)=1-2x(m),$$

$m = (n+43N_{ID}^{(2)}) \bmod 127$, and $0 \leq n < 127$ wherein $x(i+7)=(x(i+4)+x(i)) \bmod 2$, wherein, $[x(6), x(5), x(4), x(3), x(2), x(1), x(0)]$ have the values of bits from the last 17th bit to the last 11th bit of the 5G S-TMSI.

In an embodiment, $[x(6), x(5), x(4), x(3), x(2), x(1), x(0)]$ have the values of bits from the first bit to the 7th bit of the UE ID (i.e. 7 MSBs of the UE ID). For example, the UE ID is the last 10 bits of the 5G S-TMSI.

In an embodiment, $x(0)=1$ and $x(6), x(5), x(4), x(3), x(2), x(1)$ have the values of bits from the last 16th bit to the last 11th bit of the 5G S-TMSI.

In an embodiment, $x(1)=0$, $x(0)=1$ and $x(6), x(5), x(4), x(3), x(2)$ have the values of bits from the last 15th bit to the last 11th bit of the 5G S-TMSI.

In an embodiment, the WUS may be expressed as a fifth WUS sequence shown as the following:

$$d_{WUS}(n) = [1 - 2x(m)] \cdot e^{j\frac{\pi un(n+1)}{131}},$$

$m = (n+43N_{ID}^{(2)}) \bmod 127$, and $0 \leq n < 127$, where u=34. In an embodiment, u has the value of the slot number of the first PO within a PF. In an embodiment, u has the value of one plus the slot number of the first PO within a PF. In an embodiment, u has the decimal value of the extended UE ID. In an embodiment, u has the value of one plus the decimal value of the extended UE ID. In an embodiment, the u has the decimal value of the K MSB(s) of the UE ID, wherein K is an integer. In an embodiment, u has the value of one plus the decimal value of K MSB(s) of the UE ID, wherein K is an integer. The other variables and their value may be referred to the above embodiments and are not narrated herein for brevity.

In an embodiment, the WUS may be expressed as a sixth WUS sequence shown as the following:

$$d_{WUS}(n)=[1-2x(m)]$$

$m = (n+43N_{ID}^{(2)}+UE\_ID\_Ext) \bmod 127$, and $0 \leq n < 127$, wherein the UE_ID_Ext is the extended UE ID and is the last (10+U)th bit to the last 11th bit of the 5G S-TMSI in decimal format. For example, the extended UE ID may be decimal value of bits from the last 18th bit to the last 11th bit of the 5G S-TMSI (i.e. U=8). In an embodiment, the extended UE ID is one plus the decimal value of the last (10+U)th bit to the last 11th bit of the 5G S-TMSI. In an embodiment, the extended UE ID is the decimal value of M MSB(s) of the UE ID, where $1 \leq M \leq 10$ (e.g. M=5).

In an embodiment, the WUS can be transmitted multiple times. For example, the WUS is transmitted in the first slot and is transmitted again in the second slot. In an embodiment, each of WUS transmissions utilizes different WUS sequences. For example, the first WUS sequence is transmitted in the first slot and the fourth WUS sequence is transmitted in the second slot.

In an embodiment, multiple WUS sequences or multiple WUS signals can be transmitted at the same time. As the result, multiple groups of UE(s) can be indicated to perform corresponding operations (e.g., whether to receive paging or not).

In an embodiment, the UE detects the WUS sequence with the specific bits of its 5G S-TMSI. Various embodiments of the specific bits associated to the WUS sequence can be referred to the above embodiments and are not narrated herein for brevity. When the UE detects (e.g. receive) the WUS (e.g. successfully decodes the WUS), the UE receives possible paging at the next DRX-ON duration. That is, the UE receives the PDCCH that schedules paging message and corresponding PDSCH that carries paging message. When the UE does not detect the WUS (e.g. fails to decode the WUS), the UE does not receive the PDCCH that schedules paging message at the next DRX-ON duration and may can go to the sleep state or keep at the sleep state.

In this embodiment, when the WUS is not associated with the extended UE ID configured for the UE, the UE does not perform at least some procedures of receiving the paging message. As a result, the false alarm of paging (including false alarm of PDCCH that scheduling paging message and/or the PDSCH that carries paging message) can be avoided. The power consumption is therefore saved.

Embodiment 8

In an embodiment, the BS (i.e., gNB) configures multiple P-RNTIs for multiple UEs. The configuration of the multiple P-RNTIs may be broadcasted via system information broadcast (e.g., SIBx, where x is a number, such as 1 or 2). In an embodiment, the extended UE ID may be replaced by the UE ID. In an embodiment, the relationship between the P-RNTIs and the extended UE IDs may be specified (e.g. predefined) in the protocol.

FIG. 17 shows an example of associating the extended UE ID with one P-RNTI according to an embodiment of the present disclosure. In FIG. 17, the extended UE ID is bits from last 12th bit to the 11th bit of the 5G-S-TMSI. In addition, the P-RNTI "FFFD" (Hex) is configured for the UE with the extended UE ID "00" (binary), the P-RNTI "FFFC" (Hex) is configured for the UE with the extended UE ID "01" (binary), and so on.

FIG. 18 shows an example of associating the extended UE ID with one P-RNTI according to an embodiment of the present disclosure. In FIG. 18, the extended UE ID is bits from last 12th bit to the 11th bit of the 5G-S-TMSI. In addition, the P-RNTI "FFFE" (Hex) is configured for the UE with the extended UE ID "00" (binary), the P-RNTI "FFFD" (Hex) is configured for the UE with the extended UE ID "01" (binary), and so on.

FIG. 19 shows an example of associating the UE ID with one P-RNTI according to an embodiment of the present disclosure. In FIG. 19, each of P-RNTI is associated with two MSBs of the UE ID (i.e. bits from the last 10th bit to the last 9th bit of the 5G S-TMSI). As shown in FIG. 19, the P-RNTI "FFFE" (Hex) is configured for the UE with the UE ID whose 2 MSBs is "00" (binary), the P-RNTI "FFFD" (Hex) is configured for the UE with the UE ID whose 2 MSBs is "01" (binary), and so on.

FIG. 20 shows an example of associating the extended UE ID with one P-RNTI according to an embodiment of the present disclosure. In FIG. 20, the extended UE ID is bits from last 13th bit to the 11th bit of the 5G-S-TMSI. In addition, the P-RNTI "FFFE" (Hex) is configured for the UE with the extended UE ID "000" (binary), the P-RNTI "FFFD" (Hex) is configured for the UE with the extended UE ID "001" (binary), and so on.

In an embodiment, the UE receives the paging message according to its 5G S-TMSI. For example, when the last $12^{th}$ bit to last $11^{th}$ bit of the 5G S-TMSI configured for the UE are "11", the UE determines (e.g. selects) the P-RNTI of FFFA (in Hex) (e.g. based on the table shown in FIG. 17) and receives the paging message with the determined (selected) P-RNTI.

In an embodiment, the extended UE ID may be part of bits of the UE ID (i.e., the last 10 bits of the 5G S-TMSI). For example, the extended UE ID is the highest two bits of the UE ID (i.e., the last $10^{th}$ bit to last $9^{th}$ bit of the 5G S-TMSI).

Based on this embodiment, the UE may be able to reduce the numbers of detecting the PDSCH that carries paging message (by $1-1/(2^2)=1-\frac{1}{4}=\frac{3}{4}$ in examples shown in FIGS. 16 to 18). Hence, the power consumption of UE can be saved.

Embodiment 9

In an embodiment, when the BS schedules the paging message of UE, the BS may divide the PO into several groups, wherein each group is associated with a sub-set of bits of the 5G S-TMSI. FIG. 21 shows an example of dividing the PO into several groups according to an embodiment of the present disclosure. In FIG. 21, there are two groups indicated by the last $11^{th}$ bit of the 5G S-TMSI.

FIG. 22 shows an example of dividing the PO into several groups according to an embodiment of the present disclosure. In FIG. 22, there are 4 groups indicated by the last $12^{th}$ bit and the last $11^{th}$ bit of the 5G S-TMSI.

FIG. 23 shows an example of dividing the PO into several groups according to an embodiment of the present disclosure. In FIG. 23, there are 4 groups indicated by the 2 MSBs of the UE ID (i.e. last $10^{th}$ bit and the last $9^{th}$ bit of the 5G S-TMSI).

FIG. 24 shows an example of dividing the PO into several groups according to an embodiment of the present disclosure. In FIG. 24, there are 2 groups indicated by the MSB of the UE ID (i.e. last $10^{th}$ bit of the 5G S-TMSI).

In an embodiment, when the UE (e.g. expects to) receives the paging message, the UE may determine (e.g. select) the PO of receiving the paging message according to the specific bit(s) of the 5G S-TMSI or the UE ID. As a result, the power consumption of UE can be reduced.

Embodiment 10

In an embodiment, the time-frequency resources (e.g., pagingSearchSpaces, control resources sets, the positions of time-frequency resources mapped by paging or PO, DL bandwidth part) for the paging message may be used to carry some information (e.g., some bits of the UE ID and/or some bits of the 5G S-TMSI). For example, the paging-SearchSpace is divided into multiple groups where each group is associated with a sub-set (bits) of the 5G S-TMSI.

FIG. 25 shows an example of the divided paging-SearchSpace according to an embodiment of the present disclosure. In FIG. 25, there are two groups indicated by the last 11$^{th}$ bit of the 5G S-TMSI.

In an embodiment, the divided pagingSearchSpaces have the same parameters except SearchSpaceId. In an embodiment, the divided pagingSearchSpaces have the same parameters except SearchSpaceId and COntrol-REsource SET (CORESET). In an embodiment, the divided paging-SearchSpaces have the same parameters except SearchSpaceId and the offset of monitoringSlotPeriodicity-AndOffset. In an embodiment, the divided paging-SearchSpaces have the same parameters except SearchSpaceId and monitoringSymbolsWithinSlot.

FIG. 26 shows an example of the divided paging-SearchSpace according to an embodiment of the present disclosure. In FIG. 26, there are four groups indicated by the last 12$^{th}$ bit and the last 11$^{th}$ bit of the 5G S-TMSI.

FIG. 27 shows an example of the divided paging-SearchSpace according to an embodiment of the present disclosure. In FIG. 27, there are two groups indicated by the MSB of the UE ID (i.e. the last 10$^{th}$ bit of the 5G S-TMSI).

FIG. 28 shows an example of the divided paging-SearchSpace according to an embodiment of the present disclosure. In FIG. 28, there are two groups indicated by the RRC state of the UE.

FIG. 29 shows an example of the divided paging-SearchSpace according to an embodiment of the present disclosure. In FIG. 29, there are two groups indicated by the last two bits (i.e. 2 LSBs) of I-RNTI (i.e. inactive-RNTI) of the UE in the RRC inactive state.

FIG. 30 shows an example of the divided paging-SearchSpace according to an embodiment of the present disclosure. In FIG. 30, there are four groups indicated by the two MSBs of the UE ID (i.e. the last 10$^{th}$ bit and the last 9$^{th}$ bit of the 5G S-TMSI). Note that, the legacy UE (e.g. the UE of release 15 or release 16) may ignore this indication and a fifth pagingSearchSpace is used to schedule paging message(s) for the legacy UE.

In an embodiment, when the UE (e.g. expect to) receives the paging message, the UE receives the PDCCH that schedules paging message according to the specific bits in its 5G S-TMSI, the specific bits in its UE ID, its RRC state or the I-RNTI-Value of the UE under RRC inactive state. Under such a condition, the UE is able to reduce the frequency of receiving of the PDCCH that schedules paging message and/or the PDSCH that carries paging message. Thus, UE's power consumption is reduced.

Embodiment 11

In an embodiment, the gNB may divide (classify) the UEs into N groups according to their paging probability.

In an embodiment, the gNB groups the UEs according to the level of paging probability. For example, the gNB divides the paging probability into three levels low paging probability, medium paging probability and high paging probability and each level corresponds to one UE group.

In an embodiment, the gNB groups the UEs according to percentage of paging probability. For example, some percentages of paging probability are used as thresholds to indicate the UE grouping information. For example, the UE whose paging probability is small than a threshold TH1 is grouped in a UE group UEG1, the UE whose paging probability is between the threshold TH1 and a threshold TH2 is grouped in a UE group UEG2 and the rest of UEs can be grouped in the same manner.

In an embodiment, each UE group contains a maximum of M different UE IDs (since the last 10 bits of the corresponding 5G_S_TMSI of the UE has 10 bits, thus $M \leq 2^{10} = 1024$). When the number of UE IDs in a UE group, which is divided according to the paging probability, exceeds the maximum capacity of the group, the excess UEs will be grouped to an additional group. In an embodiment, the out-of-range (e.g. excess) UEs are still grouped in accordance with paging probability. In an embodiment, the out-of-range UEs in different groups are grouped in the same group.

In an embodiment, each UE group corresponds to one WUS indication. In an embodiment, the WUS is DCI carried by the PDCCH and the DCI corresponding to different UE group is scrambled by different Power saving RNTIs for Paging (PSP-RNTIs). In an embodiment, the PSP-RNTI may be the P-RNTI.

In an embodiment, the gNB broadcasts the PSP-RNTIs used by each UE group to the UE via system information broadcast. In this embodiment, the UE uses its PSP-RNTI to decode the DCI.

In an embodiment, when the DCI is decoded successfully (e.g. the DCI is consistent to its PSP-RNTI), the DCI contains the WUS information indicating the behavior of the UE. In an embodiment, the UE does not execute the PDCCH monitoring in the next DRX cycle when the UE successfully decodes the WUS. In an embodiment, the UE starts a PagingArrivalTimer for the next DRX cycle when the UE successfully decodes the WUS. In an embodiment, the UE does not starts the PagingArrivalTimer (or not execute the PDCCH monitoring) for the next DRX cycle when the UE successfully decodes the WUS. In an embodiment, the UE judges whether to monitor the PDCCH for the next DRX cycle according to the bit indication field of the WUS. For example, the UE starts the PagingArrivalTimer for the next DRX cycle when a value of the 'PDCCH monitoring' bit is '1', and the UE does not start the PagingArrivalTimer for the next DRX cycle when a value of the 'PDCCH monitoring' bit is '0'. In an embodiment, the UE starts the PagingArrivalTimer for the next DRX cycle when a value of the 'PDCCH monitoring' bit is '0', and the UE does not start the PagingArrivalTimer for the next DRX cycle when a value of the 'PDCCH monitoring' bit is '1'.

In an embodiment, when the UE fails to decode the DCI according to its PSP-RNTI (i.e. the DCI is inconsistent to its PSP-RNTI), the DCI is not an indication configured for the UE group of the UE. Under such a condition, the UE may perform default operations. For example, UE may start the PagingArrivalTimer for the next DRX cycle and perform the PDCCH monitoring.

Embodiment 12

In an embodiment, the gNB divides the UEs into N groups according to the paging probability, wherein N is an integer.

In an embodiment, the gNB groups the UE according to level of the paging probability. For example, the gNB divides the paging probability into three levels: low paging probability, medium paging probability and high paging probability and each level corresponds to a UE group.

In an embodiment, the gNB groups the UE according to percentage of paging probability. For example, some percentages of paging probability are used as thresholds to indicate the UE grouping information. For example, the UE whose paging probability is small than a threshold TH1 is grouped in a UE group UEG1, the UE whose paging probability is between the threshold TH1 and a threshold TH2 is grouped in a UE group UEG2 and the rest UE can be grouped in the same manner.

In an embodiment, each UE group contains a maximum of P different UE-IDs (that is, the last 10 bits of the corresponding 5G_S_TMSI of the UE has P cases). In an embodiment, when the number of UE-IDs divided by the paging probability exceeds the maximum capacity of the group, the excess UEs will be grouped to the additional group. In an embodiment, the out-of-range (e.g. excess) UEs are still grouped in accordance with paging probability. In an embodiment, the out-of-range UEs in different groups are grouped in the same group.

In an embodiment, the gNB sends a WUS to the UE to indicate its PDCCH monitoring operation for the next DRX cycle. In an embodiment, the WUS is a DCI carried by the PDCCH. In an embodiment, the DCI contains N bits to indicate the PDCCH monitoring operation of the UE group and each of the N bits corresponds to one UE group.

The gNB broadcasts the group ID corresponding to the UE via system information. The UE performs the operation according to the bit indication field in the DCI.

In an embodiment, the UE starts the PagingArrivalTimer for the next DRX cycle when a value of the 'PDCCH monitoring' bit is '1', and the UE does not start the PagingArrivalTimer for the next DRX cycle when a value of the 'PDCCH monitoring' bit is '0'. In an embodiment, the UE starts the PagingArrivalTimer for the next DRX cycle when a value of the 'PDCCH monitoring' bit is '0', and the UE not start the PagingArrivalTimer for the next DRX cycle when a value of the 'PDCCH monitoring' bit is '1'.

Embodiment 13

In an embodiment, the gNB divides the UE into N groups according to the paging probability, wherein N is an integer.

In an embodiment, the gNB groups the UE according to level of the paging probability. For example, the gNB divides paging probability into three levels: low paging probability, medium paging probability and high paging probability and each level corresponds to a UE group.

In an embodiment, the gNB groups the UE according to percentage of paging probability. For example, some percentages of paging probability are used as thresholds to indicate the UE grouping information. For example, the UE whose paging probability is small than a threshold TH1 is grouped in a UE group UEG1, the UE whose paging probability is between the threshold TH1 and a threshold TH2 is grouped in a UE group UEG2 and the rest of UEs can be grouped in the same manner.

In an embodiment, the gNB sends a WUS to the UE to indicate its PDCCH monitoring operation for the next DRX cycle. In an embodiment, the WUS is a sequence. In an embodiment, the sequence is generated or initialized by the group ID of the UE group, so that only the UE in the corresponding group is able to obtain the paging indication information successfully.

In an embodiment, the WUS may be used for a periodical synchronization of the UE (e.g., downlink synchronization, precise synchronization), an automatic gain control (AGC) and measurement (e.g., received power measurement of reference signal). In an embodiment, the WUS is transmitted before the PO (e.g., Q milliseconds before the first PO, for example, Q=3). In an embodiment, the WUS is transmitted before the SSB (e.g., WUS is transmitted before P slots of the SSB, for example, P=2). In an embodiment, the WUS is transmitted before the P slots of the latest SSB before the first PO. In an embodiment, the WUS is transmitted after the SSB (e.g., after the P slots of the SSB, for example, P=5). In an embodiment, the WUS is transmitted after the P slots of the latest SSB before the first PO.

In an embodiment, the WUS sequence may be a seventh WUS sequence shown as the following:

$$d_{WUS}(n)=[1-2x_0((n+m_0)\bmod 127)][1-2x_1((n+m_1)\bmod 127)]$$

$$m_0 = 15\left\lfloor \frac{N_{ID}^{(1)}}{112} \right\rfloor + 5N_{ID}^{(2)},$$

$m_1 = N_{ID}^{(1)} \bmod 112$, and $0 \leq n < 127$ wherein $\lfloor \cdot \rfloor$ fetches the greatest integer that does not excess the operand, $N_{ID}^{(1)} \in \{0, 1, \ldots, 335\}$ which is a first cell ID, $N_{ID}^{(2)} \in \{0, 1, 2\}$ which is a second cell ID, and $x(n)$ is as the following:

$x_0(i+7)=(x_0(i+4)+x_0(i))\bmod 2$, $x_1(i+7)=(x_1(i+4)+x_1(i))\bmod 2$,

In this embodiment, both [$x_0(6)$, $x_0(5)$, $x_0(4)$, $x_0(3)$, $x_0(2)$, $x_0(1)$, $x_0(0)$] and [$x_1(6)$, $x_1(5)$, $x_1(4)$, $x_1(3)$, $x_1(2)$, $x_1(1)$, $x_1(0)$] are corresponding to the binary representation of the group ID value (seven bits).

In an embodiment, the WUS sequence may be an eighth WUS sequence shown as the following:

$$d_{WUS}(n)=[1-2x_0((n+m_0)\bmod 127)][1-2x_1((n+m_1)\bmod 127)]e^{j\frac{\pi un(n+1)}{131}}$$

$$m_0 = 15\left\lfloor \frac{N_{ID}^{(1)}}{112} \right\rfloor + 5N_{ID}^{(2)},$$

$m_1 = N_{ID}^{(1)} \bmod 112$, and $0 \leq n < 127$ where u=29. In an embodiment, u is the slot number of the first PO in the PF. In an embodiment, u equals the slot number of the first PO in the PF plus one. In an embodiment, u equals the decimal number of the group ID. Note that, the definitions and values of other variables may be referred to the aforementioned embodiments and are not narrated herein for brevity.

In an embodiment, the WUS sequence may be a ninth WUS sequence shown as the following:

$$d_{WUS}(n)=1-2x(m),$$

$m=(n+43N_{ID}^{(2)})\bmod 127$, and $0 \leq n < 127$ wherein $x(i+7)=(x(i+4)+x(i))\bmod 2$, wherein, [$x(6)$, $x(5)$, $x(4)$, $x(3)$, $x(2)$, $x(1)$, $x(0)$] correspond to the binary representation of the group ID value (seven bits).

In an embodiment, the WUS sequence may be a tenth WUS sequence shown as the following:

$$d_{WUS}(n) = [1 - 2x(m)] \cdot e^{j\frac{\pi un(n+1)}{131}},$$

$m=(n+43N_{ID}^{(2)})\bmod 127$, and $0 \leq n < 127$, where u=34. In an embodiment, u is the slot number of the first PO in the PF. In an embodiment, u equals the slot number of the first PO in the PF plus one. In an embodiment, u equals the decimal number of the group ID. Note that, the definitions and values of other variables may be referred to the aforementioned embodiments and are not narrated herein for brevity.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method performed by a wireless terminal, the wireless communication method comprising:
    receiving a wake-up signal, wherein the wake-up signal includes N bits, wherein each of the N bits corresponds to one user equipment (UE) group;
    determining a paging occasion (PO) based on a paging identification (ID) of the wireless terminal;
    obtaining a monitoring bit in the wake-up signal;
    receiving, from a wireless network node, a paging message at the determined PO, wherein a presence of the paging message is based on the monitoring bit,
        wherein the wireless terminal has an extended user equipment (UE) identifier (ID) that is associated with a 5G serving temporary mobile subscriber identity (S-TMSI) configured for the wireless terminal, and
        wherein the extended UE ID of the wireless terminal comprises 15 bits of the 5G S-TMSI configured for the wireless terminal; and
    receiving a demodulation reference signal (DMRS) associated with the paging message,
        wherein the DMRS is initialized based on an initialization seed which is generated based on a second extended UE ID corresponding to at least one second wireless terminal, and
        wherein the second extended UE ID is a subset of at least one S-TMSI configured for the at least one second wireless terminal.

2. The method of claim 1, wherein the wake-up signal includes a paging message indication that indicates the presence or an absence of the paging message.

3. The method of claim 1, wherein a value of the monitoring bit in the wake-up signal is 1.

4. The method of claim 1,
    wherein the wake-up signal is a downlink control information (DCI) carried by a physical downlink control channel (PDCCH), and
    wherein the DCI is scrambled by a power saving radio network temporary identifier for paging (PSP-RNTI) with a value of 0xFFFC.

5. The method of claim 1, wherein the extended UE ID of the wireless terminal comprises bits from last 13th bit to 11th bit of the 5G S-TMSI configured for the wireless terminal.

6. The method of claim 1, wherein the DMRS is on a physical downlink control channel (PDCCH), a physical downlink shared channel (PDSCH), a wake-up channel, or a PDCCH scheduling the paging message.

7. A wireless communication method performed by a wireless network node, the wireless communication method comprising:
    transmitting, to a wireless terminal, a wake-up signal that includes a monitoring bit, wherein the wake-up signal includes N bits, wherein each of the N bits corresponds to one user equipment (UE) group;
    transmitting, to the wireless terminal, a paging message at a paging occasion (PO), wherein a presence of the paging message is based on the monitoring bit,
        wherein the wireless terminal has an extended user equipment (UE) identifier (ID) that is associated with a 5G serving temporary mobile subscriber identity (S-TMSI) configured for the wireless terminal, and
        wherein the extended UE ID of the wireless terminal comprises 15 bits of the 5G S-TMSI configured for the wireless terminal; and
    transmitting a demodulation reference signal (DMRS) associated with the paging message,
        wherein the DMRS is initialized based on an initialization seed which is generated based on a second extended UE ID corresponding to at least one second wireless terminal, and
        wherein the second extended UE ID is a subset of at least one S-TMSI configured for the at least one second wireless terminal.

8. The method of claim 7, wherein the wake-up signal includes a paging message indication that indicates the presence or an absence of the paging message.

9. The method of claim 7, wherein a value of the monitoring bit in the wake-up signal is 1.

10. The method of claim 7,
    wherein the wake-up signal is a downlink control information (DCI) carried by a physical downlink control channel (PDCCH), and
    wherein the DCI is scrambled by a power saving radio network temporary identifier for paging (PSP-RNTI) with a value of 0xFFFC.

11. The method of claim 7, wherein the DMRS is on a physical downlink control channel (PDCCH), a physical downlink shared channel (PDSCH), a wake-up channel, or a PDCCH scheduling the paging message.

12. A wireless terminal, comprising at least one processor and a memory that includes instructions stored thereupon, the instructions upon execution by the at least one processor configures the wireless terminal to:
    receive a wake-up signal, wherein the wake-up signal includes N bits, wherein each of the N bits corresponds to one user equipment (UE) group;
    determine a paging occasion (PO) based on a paging identification (ID) of the wireless terminal;
    obtain a monitoring bit in the wake-up signal;
    receive, from a wireless network node, a paging message at the determined PO, wherein a presence of the paging message is based on the monitoring bit,
        wherein the wireless terminal has an extended user equipment (UE) identifier (ID) that is associated with a 5G serving temporary mobile subscriber identity (S-TMSI) configured for the wireless terminal, and
        wherein the extended UE ID of the wireless terminal comprises 15 bits of the 5G S-TMSI configured for the wireless terminal; and
    receive a demodulation reference signal (DMRS) associated with the paging message,
        wherein the DMRS is initialized based on an initialization seed which is generated based on a second extended UE ID corresponding to at least one second wireless terminal, and
        wherein the second extended UE ID is a subset of at least one S-TMSI configured for the at least one second wireless terminal.

13. The wireless terminal of claim 12, wherein the wake-up signal includes a paging message indication that indicates the presence or an absence of the paging message.

14. The wireless terminal of claim 12, wherein a value of the monitoring bit in the wake-up signal is 1.

15. The wireless terminal of claim 12, wherein the wake-up signal is a downlink control information (DCI) carried by a physical downlink control channel (PDCCH).

16. The wireless terminal of claim 15, wherein the DCI is scrambled by a power saving radio network temporary identifier for paging (PSP-RNTI) with a value of 0xFFFC.

17. The wireless terminal of claim 12, wherein the extended UE ID of the wireless terminal comprises bits from last 13th bit to 11th bit of the 5G S-TMSI configured for the wireless terminal.

18. A wireless network node, comprising at least one processor and a memory that includes instructions stored thereupon, the instructions upon execution by the at least one processor configures the wireless network node to:
    transmit, to a wireless terminal, a wake-up signal that includes a monitoring bit, wherein the wake-up signal includes N bits, wherein each of the N bits corresponds to one user equipment (UE) group; and
    transmit, to the wireless terminal, a paging message at a paging occasion (PO), wherein a presence of the paging message is based on the monitoring bit,
        wherein the wireless terminal has an extended user equipment (UE) identifier (ID) that is associated with a 5G serving temporary mobile subscriber identity (S-TMSI) configured for the wireless terminal, and
        wherein the extended UE ID of the wireless terminal comprises 15 bits of the 5G S-TMSI configured for the wireless terminal; and
    transmit a demodulation reference signal (DMRS) associated with the paging message,
        wherein the DMRS is initialized based on an initialization seed which is generated based on a second extended UE ID corresponding to at least one second wireless terminal, and
        wherein the second extended UE ID is a subset of at least one S-TMSI configured for the at least one second wireless terminal.

19. The wireless network node of claim 18, wherein the wake-up signal includes a paging message indication that indicates the presence or an absence of the paging message.

20. The wireless network node of claim 18, wherein a value of the monitoring bit in the wake-up signal is 1.

21. The wireless network node of claim 18, wherein the wake-up signal is a downlink control information (DCI) carried by a physical downlink control channel (PDCCH).

22. The wireless network node of claim 21, wherein the DCI is scrambled by a power saving radio network temporary identifier for paging (PSP-RNTI) with a value of 0xFFFC.

* * * * *